United States Patent
Chen et al.

(10) Patent No.: US 9,517,942 B2
(45) Date of Patent: *Dec. 13, 2016

(54) TRANSITION-METAL-CONTAINING ZEOLITE

(71) Applicant: MITSUBISHI PLASTICS, INC., Chiyoda-ku, Tokyo (JP)

(72) Inventors: Haijun Chen, Yokohama (JP); Takahiko Takewaki, Yokohama (JP); Takeshi Matsuo, Yokohama (JP)

(73) Assignee: MITSUBISHI PLASTICS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,889

(22) Filed: Feb. 9, 2015

(65) Prior Publication Data

US 2015/0218007 A1 Aug. 6, 2015

Related U.S. Application Data

(62) Division of application No. 13/993,566, filed as application No. PCT/JP2012/065573 on Jun. 19, 2012.

(30) Foreign Application Priority Data

Jun. 27, 2011 (JP) ................................. 2011-141990
Apr. 16, 2012 (JP) ................................. 2012-092905

(51) Int. Cl.

| | |
|---|---|
| *B01J 20/18* | (2006.01) |
| *C01B 39/54* | (2006.01) |
| *B01D 53/94* | (2006.01) |
| *B01J 20/30* | (2006.01) |
| *B01J 29/85* | (2006.01) |
| *B01D 53/28* | (2006.01) |
| *B01J 29/76* | (2006.01) |
| *B01J 29/84* | (2006.01) |
| *B01J 35/00* | (2006.01) |
| *B01J 20/28* | (2006.01) |
| *B01J 35/10* | (2006.01) |
| *B01J 37/10* | (2006.01) |

(52) U.S. Cl.
CPC ............... *C01B 39/54* (2013.01); *B01D 53/28* (2013.01); *B01D 53/94* (2013.01); *B01D 53/9418* (2013.01); *B01J 20/18* (2013.01); *B01J 20/28064* (2013.01); *B01J 20/3078* (2013.01); *B01J 29/763* (2013.01); *B01J 29/84* (2013.01); *B01J 29/85* (2013.01); *B01J 35/002* (2013.01); *B01J 35/1023* (2013.01); *B01J 37/10* (2013.01); *B01D 2251/2062* (2013.01); *B01D 2253/108* (2013.01); *B01D 2253/1085* (2013.01); *B01D 2253/25* (2013.01); *B01D 2255/20738* (2013.01); *B01D 2255/20761* (2013.01); *B01D 2255/50* (2013.01); *B01D 2255/9207* (2013.01); *B01J 2229/186* (2013.01); *Y10T 428/2982* (2015.01)

(58) Field of Classification Search
CPC ..... B01J 20/18; B01J 20/3078; B01J 20/3085; F25B 17/08
USPC ......... 252/75, 77, 69; 62/476, 483; 423/700, 423/713, 705; 502/64
See application file for complete search history.

(56) References Cited

U.S. PATENT DOCUMENTS

| | | | |
|---|---|---|---|
| 5,374,409 A | 12/1994 | Kasahara et al. | |
| 8,795,418 B2 * | 8/2014 | Tabata | B01J 20/02 427/386 |
| 9,387,457 B2 * | 7/2016 | Chen | B01J 20/18 |
| 9,409,787 B2 * | 8/2016 | Chen | C01B 39/54 |
| 2004/0089001 A1 * | 5/2004 | Kakiuchi | B01J 20/0292 62/112 |
| 2004/0093876 A1 * | 5/2004 | Inagaki | B01J 20/02 62/112 |
| 2006/0130652 A1 * | 6/2006 | Takewaki | B01D 53/28 95/148 |
| 2006/0210472 A1 | 9/2006 | Hastoy et al. | |
| 2006/0245994 A1 | 11/2006 | Watanabe et al. | |

(Continued)

FOREIGN PATENT DOCUMENTS

| | | |
|---|---|---|
| CN | 102259892 A | 11/2011 |
| JP | 4-055310 A | 2/1992 |

(Continued)

OTHER PUBLICATIONS

R. Garcia et al., Aluminophosphates Templated by Metal-Amine Complexes As Catalyst Precursors, Studies in Surface Science and Catalysis, 2014, 154, 993-1000.

(Continued)

*Primary Examiner* — Douglas McGinty
(74) *Attorney, Agent, or Firm* — Sughrue Mion, PLLC

(57) ABSTRACT

A transition-metal-containing silicoaluminophosphate zeolite having excellent high-temperature hydrothermal durability is easily and efficiently produced. A method for producing a transition-metal-containing zeolite that contains a silicon atom, a phosphorus atom, and an aluminum atom in at least its framework structure includes hydrothermal synthesis using an aqueous gel containing a silicon atom raw material, an aluminum atom raw material, a phosphorus atom raw material, a transition metal raw material, and a polyamine (other than diamines). A transition-metal-containing silicoaluminophosphate zeolite produced by hydrothermal synthesis using a zeolite raw material and the aqueous gel containing the transition metal raw material and the polyamine has excellent high-temperature hydrothermal durability and high catalytic activity.

14 Claims, 19 Drawing Sheets

(56) References Cited

U.S. PATENT DOCUMENTS

| | | | |
|---|---|---|---|
| 2008/0145310 A1 | 6/2008 | Breuninger | |
| 2010/0310440 A1 | 12/2010 | Bull et al. | |
| 2012/0020875 A1* | 1/2012 | Matsuo | B01D 53/9418 423/700 |
| 2012/0028789 A1* | 2/2012 | Matsuo | B01D 53/9418 502/74 |
| 2013/0266785 A1* | 10/2013 | Chen | B01J 20/18 428/219 |
| 2014/0283545 A1* | 9/2014 | Chen | B01J 20/18 62/476 |
| 2015/0110711 A1* | 4/2015 | Franco | B01J 29/85 423/703 |
| 2015/0133287 A1* | 5/2015 | Matsuo | B01D 53/9418 502/60 |
| 2016/0082425 A1* | 3/2016 | Matsuo | B01D 53/9418 502/74 |

FOREIGN PATENT DOCUMENTS

| | | |
|---|---|---|
| JP | 2004-093117 A | 3/2004 |
| JP | 2004-132690 A | 4/2004 |
| JP | 2006-248892 A | 9/2006 |
| JP | 2008-519748 A | 6/2008 |
| JP | 2009-109185 A | 5/2009 |
| JP | 2011-202947 A | 10/2011 |
| WO | 2009/099937 A1 | 8/2009 |
| WO | 2010/084930 A1 | 7/2010 |
| WO | 2012/029159 A1 | 3/2012 |

OTHER PUBLICATIONS

B. Yun-Shan et al., Synthesis and Characterization of CoSAPO-101 Molecular Sieve Large Single Crystals, Chinese Journal of Inorganic Chemistry, Sep. 2010, 26, 1690-1694.

Japanese Office Action issued in corresponding JP Application No. 2012-137981, dated Jul. 14, 2015 with English translation.

Bremer et al, "Influence of Cations on the Thermal Stability of Modified Y Zeolites", Molecular Sieves, 1973, pp. 249-257, vol. 121, Chapter 22.

A. Buchholz et al., "Successive steps of hydration and dehydration of silicoaluminophosphates H-SAPO-34 and H-SAPO-37 investigated by in situ CF MAS NMR spectroscopy", Microporous and Mesoporous Materials, 2003, pp. 157-168, vol. 57.

B.I. Palella et al., "On the hydrothermal stability of CuAPSO-34 microporous catalysts for N2O decomposition: a comparison with CuZSM-5", Journal of Catalysis, 2003, pp. 100-106, vol. 217.

International Search Report of PCT/JP2012/065573 dated Sep. 18, 2012.

Supplementary Partial European Search Report issued in corresponding EP Application No. 12804306.4 dated Mar. 9, 2015.

English translation of JP 2003-183020A published Jul. 3, 2003 to Mitsubishi Chemicals Corp.

English translation of WO 2010/084930A1 published Jul. 29, 2010 to Mitsubishi Chemicals Corp.

* cited by examiner

WATER VAPOR ADSORPTION ISOTHERM OF ZEOLITE F

WATER VAPOR ADSORPTION ISOTHERM OF ZEOLITE G

WATER VAPOR ADSORPTION ISOTHERM OF ZEOLITE 9

ZEOLITE 9 ACCORDING TO EXAMPLE 9

ZEOLITE C ACCORDING TO COMPARATIVE EXAMPLE 3

ZEOLITE T ACCORDING TO COMPARATIVE EXAMPLE 9

WATER VAPOR ADSORPTION ISOTHERM OF ZEOLITE 2

TRANSITION-METAL-CONTAINING ZEOLITE

This is a divisional of U.S. application Ser. No. 13/993,566, filed Jun. 12, 2013, which is a national stage of PCT/JP2012/065573, filed Jun. 19, 2012, which claims priority from Japanese Patent Application Nos. 2011-141990, filed Jun. 27, 2011, and 2012-092905, filed Apr. 16, 2012, the contents of all of which are hereby incorporated by reference into this application.

FIELD OF THE INVENTION

The present invention relates to a transition-metal-containing silicoaluminophosphate zeolite, and an exhaust gas treatment catalyst and a water vapor adsorbent each containing the transition-metal-containing zeolite.

BACKGROUND ART

Background Art-1

Production of a transition-metal-containing zeolite involves a process of impregnating a synthesized zeolite with a transition metal salt solution or a process of loading a zeolite with a transition metal by ion exchange. The loading process has the following problems. The transition metal salt solution for use in the impregnation of a zeolite is generally an aqueous solution of a transition metal salt, which tends to form its hydroxide. A transition metal hydroxide formed in an immersion liquid is deposited not only in pores of a zeolite carrier but also on the surface of zeolite particles in a large amount. This makes it difficult to uniformly deposit the transition metal in the pores of the zeolite. There are also problems associated with treatment of a large amount of waste fluid discharged in the transition metal loading process and problems associated with a large number of processes, such as filtration and washing of zeolite immersion slurry.

Patent Document 1 and Non-patent Document 1 propose a one-pot synthesis method for synthesizing a transition-metal-containing silicoaluminophosphate zeolite in a single process by introducing a transition metal raw material, such as a transition metal oxide or a transition metal salt, into a gel in a zeolite synthesis process. However, in a transition-metal-containing silicoaluminophosphate zeolite synthesized by this method, the transition metal is introduced by replacing part of the zeolite framework elements. Thus, the silicoaluminophosphate zeolite has poor performance as a catalyst or an adsorbent, and high-temperature hydrothermal treatment causes degradation of the zeolite. Furthermore, a transition-metal-containing zeolite synthesized by this method contains impurities, such as an amorphous, and therefore has poor catalytic performance.

Patent Document 2 proposes a method for synthesizing a Cu-containing silicoaluminophosphate zeolite by adding Cu to a zeolite synthesis starting gel. However, a transition-metal-containing zeolite synthesized by this method also has low hydrothermal stability.

Patent Document 3 proposes a method for synthesizing a Cu-containing silicoaluminophosphate zeolite by loading a synthesized silicoaluminophosphate zeolite with Cu. A transition-metal-containing zeolite synthesized by this method has high catalytic activity and hydrothermal stability. It is also mentioned that the transition-metal-containing zeolite has high durability in water adsorption and desorption. Although the zeolite produced in accordance with Patent Document 3 can have a zeolite structure even after a water vapor adsorption and desorption cycle durability test, the zeolite has reduced catalytic performance at low temperature (for example, 200° C.) and, in particular, insufficient low-temperature catalytic activity after a water vapor adsorption and desorption cycle durability test.

When a transition-metal-containing silicoaluminophosphate zeolite is used as a catalyst or an adsorbent, water adsorption and desorption occur frequently on the zeolite. For example, when used in a vehicle, a zeolite catalyst absorbs moisture in the air while the vehicle is parked. While the vehicle is running, the zeolite catalyst discharges the moisture into the air as the exhaust gas temperature increases. Thus, water adsorption and desorption occur on the zeolite catalyst. It is also supposed that a transition metal fixed to a framework element bond Si—O—Al binding site of a transition-metal-containing zeolite proposed by Patent Document 3 aggregates because of variations in Si—O—Al bond angle or bond length caused by water adsorption and desorption. This reduces the number of dispersive transition metal catalytic active sites and catalytic activity.

In the silicoaluminophosphate zeolite described in Non-patent Document 2, the bond angle or bond length of a framework element bond Si—O—Al or P—O—Al varies with water adsorption and desorption. Repetitive water adsorption and desorption decompose the framework element bond Si—O—Al or P—O—Al and destroy the zeolite framework structure. The destruction of the zeolite framework structure further reduces catalytic activity because of a reduced catalyst surface area.

In the silicoaluminophosphate zeolite described in Patent Document 4, water adsorption or desorption changes the lattice constant of the zeolite, causing contraction or expansion. Patent Document 4 describes a problem of a honeycomb structure having a honeycomb unit containing the silicoaluminophosphate zeolite that the honeycomb unit is easy to break because of contraction or expansion caused by water adsorption and desorption. Thus, in accordance with Patent Document 4, the silicoaluminophosphate has a particular ratio of the amount of Si substance to the total amount of Al and P substances and a particular number of acid points. However, only such adjustments described in Patent Document 4 are insufficient in terms of high-temperature hydrothermal durability as well as catalytic activity in exhaust gas treatment and water vapor adsorption ability after a water vapor adsorption and desorption cycle durability test.

Background Art-2

Because of an advantageous effect of improving catalytic activity using a transition metal, transition-metal-containing aluminophosphate zeolites have uses in various fields, such as the chemical industry and automobile exhaust gas purification.

Transition-metal-containing aluminophosphate zeolites are synthesized by loading a zeolite with a transition metal by an impregnation method or an ion exchange method. Transition-metal-containing zeolites produced by this method have high transition metal dispersibility at a low loading level of the transition metal (generally less than 3% by weight). In this case, however, the low loading level of the transition metal results in a small number of catalyst active sites derived from the transition metal, resulting in poor catalytic performance.

Non-patent Document 3 describes a method for improving the stability of a zeolite by loading the zeolite with a transition metal. In accordance with this method, insufficient transition metal loading results in low stability of the zeolite. Thus, a certain amount of transition metal must be loaded in order to achieve satisfactory catalytic performance and stability of the zeolite.

However, an increase in transition metal loading by using a conventional synthesis method causes aggregation of the transition metal in the zeolite, resulting in poor dispersion of the transition metal. For example, in accordance with Patent Document 3, an analysis of a prepared zeolite with an electron probe microanalyzer shows the aggregation of transition metal.

Patent Document 5 increases the frequency of ion exchange loading in the synthesis of an aluminophosphate zeolite containing 3% by weight copper. However, an increased loading frequency results in decomposition of part of the zeolite. The transition-metal-containing aluminophosphate zeolite synthesized by this method has a low degree of crystallinity and a specific surface area of 350 m$^2$/g or less. In accordance with this method, an increase in transition metal loading results in degradation of the zeolite crystal structure.

In accordance with Patent Document 1, a transition metal raw material is introduced into a gel in a zeolite synthesis process to synthesize an aluminophosphate zeolite containing approximately 3.6% by weight copper. However, the resulting product contains an amorphous impurity, and the zeolite has a specific surface area of 500 m$^2$/g or less.

Also in accordance with Patent Document 2, a transition metal raw material is introduced into a gel in a zeolite synthesis process to synthesize a transition-metal-containing aluminophosphate zeolite. However, the synthesized zeolite has low thermal stability.

Although transition-metal-containing aluminophosphate zeolites synthesized by these methods have a high loading level of the transition metal, the zeolites disadvantageously have a low degree of crystallinity and low stability.

CITATION LIST

Patent Document

Patent Document 1: U.S. Patent Application Publication No. 2010/0310440 A1
Patent Document 2: Chinese Patent Application Publication No. 102259892
Patent Document 3: International Publication WO 2010/084930 A
Patent Document 4: International Publication WO 2012/029159 A1
Patent Document 5: International Publication WO 2009/099937 A1

Non-Patent Document

Non-Patent Document 1: Journal of Catalysis, 217(2003), 100-106
Non-Patent Document 2: Microporous and Mesoporous Materials, 57(2003), 157-168
Non-Patent Document 3: Molecular Sieves, Advances in Chemistry Series, Vol. 121, Chapter 22, pp. 249-257 (1973), AMERICAN CHEMICAL SOCIETY.

OBJECT OF THE INVENTION

In view of the background art-1, the present invention provides a method for easily and efficiently producing a transition-metal-containing silicoaluminophosphate zeolite that has excellent performance as a catalyst or an adsorbent and excellent high-temperature hydrothermal durability.

The present invention also provides a transition-metal-containing aluminophosphate zeolite that is stable during water adsorption and desorption and has high catalytic performance.

In view of the background art-2, the present invention also provides a transition-metal-containing aluminophosphate zeolite that has a high transition metal content, excellent transition metal dispersion, and high stability.

SUMMARY OF THE INVENTION

As a result of extensive studies, the present inventors found that a transition-metal-containing silicoaluminophosphate zeolite produced by a hydrothermal synthesis using an aqueous gel containing a transition metal raw material and a polyamine together with a zeolite raw material has higher high-temperature hydrothermal durability and catalytic activity than a transition-metal-containing silicoaluminophosphate zeolite synthesized by a conventional one-pot synthesis method.

The present inventors also found that a transition-metal-containing zeolite that can adsorb a large amount of water at low humidity and a certain amount of water at high humidity has high catalytic performance and high stability during water adsorption and desorption.

As a result of extensive studies, the present inventors also found that a transition-metal-containing aluminophosphate zeolite that has element mapping of a transition metal in the zeolite determined with an electron probe microanalyzer showing that the coefficient of variation in intensity of the transition metal is 33% or less, the transition metal content is 3% by weight or more, and the molar ratio of an aluminum atom to the total of a silicon atom and a phosphorus atom is 0.9 or more has a high transition metal content, excellent transition metal dispersion, and high stability.

The present invention has been achieved on the basis of such findings and is summarized as follows:

[1] A method for producing a transition-metal-containing zeolite that contains at least a silicon atom, a phosphorus atom, and an aluminum atom in its framework structure, including: hydrothermal synthesis using an aqueous gel containing a silicon atom raw material, an aluminum atom raw material, a phosphorus atom raw material, a transition metal raw material, and a polyamine (other than diamines).

[2] The method for producing a transition-metal-containing zeolite according to [1], wherein the aqueous gel further contains at least one selected from the group consisting of alicyclic heterocyclic compounds containing at least a nitrogen atom as a heteroatom, alkylamines, cycloalkylamines, and tetraalkylammonium hydroxides.

[3] The method for producing a transition-metal-containing zeolite according to [1] or [2], wherein the polyamine has a general formula of $H_2N-(C_nH_{2n}NH)_x-H$ (wherein n denotes an integer in the range of 2 to 6, and x denotes an integer in the range of 2 to 10).

[4] The method for producing a transition-metal-containing zeolite according to any one of [1] to [3], wherein the transition metal is iron and/or copper.

[5] The method for producing a transition-metal-containing zeolite according to any one of [1] to [4], wherein the molar ratios of the aluminum atom raw material, the silicon atom raw material, the phosphorus atom raw material, and the transition metal (M) raw material in the aqueous gel on an oxide basis are as follows:

the $SiO_2/Al_2O_3$ ratio is 0.1 or more and 0.8 or less,
the $P_2O_5/Al_2O_3$ ratio is 0.6 or more and 1.2 or less, and
the $M_aO_b/Al_2O_3$ ratio is 0.05 or more and 1 or less (wherein a and b denote the atomic ratios of M and O, respectively).

[6] The method for producing a transition-metal-containing zeolite according to any one of [1] to [5], wherein the transition metal raw material and at least part of the polyamine in the aqueous gel form a complex.

[7] The method for producing a transition-metal-containing zeolite according to any one of [1] to [6], wherein the aqueous gel is prepared by mixing the transition metal raw material with at least part of the polyamine and then with the other raw materials.

[8] The method for producing a transition-metal-containing zeolite according to any one of [1] to [5], wherein the aqueous gel is prepared by mixing the transition metal raw material with the phosphorus atom raw material and then with the other raw materials.

[9] The method for producing a transition-metal-containing zeolite according to any one of [1] to [8], wherein the transition metal is copper.

[10] The method for producing a transition-metal-containing zeolite according to any one of [1] to [9], wherein the transition metal raw material is copper (II) oxide and/or copper (II) acetate.

[11] A transition-metal-containing zeolite, produced by the method for producing a transition-metal-containing zeolite according to any one of [1] to [10].

[12] A transition-metal-containing zeolite containing at least a silicon atom, a phosphorus atom, and an aluminum atom in its framework structure, wherein a water vapor adsorption isotherm of the transition-metal-containing zeolite measured at 25° C. shows that the amount of adsorption at a relative vapor pressure of 0.01 is 1.3 mol/mol-Si or more and that the amount of adsorption at a relative vapor pressure of 0.7 is 150 mg/g or more and 300 mg/g or less.

[13] The transition-metal-containing zeolite according to [12], produced by the method for producing a transition-metal-containing zeolite according to any one of [1] to [10].

[14] The transition-metal-containing zeolite according to any one of [11] to [13], wherein the molar ratios of an aluminum atom, a silicon atom, a phosphorus atom, and a transition metal (M) on an oxide basis are as follows:
the $SiO_2/Al_2O_3$ ratio is 0.1 or more and 0.8 or less,
the $P_2O_5/Al_2O_3$ ratio is 0.6 or more and 1.2 or less, and
the $M_aO_b/Al_2O_3$ ratio is 0.05 or more and 1 or less (wherein a and b denote the atomic ratios of M and O, respectively).

[15] An aluminophosphate zeolite containing 3% by weight or more transition metal M, wherein element mapping of the transition metal M in the zeolite determined with an electron probe microanalyzer shows that the coefficient of variation in intensity of the transition metal M is 33% or less and that the molar ratio of an aluminum atom to the total of a silicon atom and a phosphorus atom is 0.9 or more.

[16] An aluminophosphate zeolite containing 3% by weight or more transition metal M and having an 8-membered ring structure in its framework structure, wherein element mapping of the transition metal M in the zeolite determined with an electron probe microanalyzer shows that the coefficient of variation in intensity of the transition metal M is 33% or less and that the molar ratio of an aluminum atom to the total of a silicon atom and a phosphorus atom is 0.9 or more.

[17] The transition-metal-containing zeolite according to any one of [11] to [16], wherein the transition metal is iron and/or copper.

[18] The transition-metal-containing zeolite according to any one of [11] to [17], wherein the zeolite has a BET specific surface area of 500 $m^2/g$ or more.

[19] The transition-metal-containing zeolite according to any one of [11] to [18], wherein the zeolite has a framework density of 10.0 T/1000 cubic angstroms or more and 16.0 T/1000 cubic angstroms or less in accordance with a zeolite structure defined by the International Zeolite Association (IZA).

[20] The transition-metal-containing zeolite according to any one of [11] to [19], wherein the zeolite has a zeolite structure of CHA as defined by the International Zeolite Association (IZA).

[21] An exhaust gas treatment catalyst, including the transition-metal-containing zeolite according to any one of [11] to [20].

[22] A water vapor adsorbent, including the transition-metal-containing zeolite according to any one of [11] to [20].

Advantageous Effects of Invention

In accordance with the present invention, a transition-metal-containing silicoaluminophosphate zeolite having excellent high-temperature hydrothermal durability and high catalytic activity can be easily and efficiently produced by hydrothermal synthesis using an aqueous gel containing a transition metal raw material and a polyamine together with a zeolite raw material. In the hydrothermal synthesis process of the zeolite, the transition metal can be well dispersed in the pores of the zeolite while the zeolite is synthesized.

The present invention can also provide a transition-metal-containing zeolite containing at least a silicon atom, a phosphorus atom, and an aluminum atom in its framework structure, wherein a water vapor adsorption isotherm of the transition-metal-containing zeolite measured at 25° C. shows that the amount of adsorption at a relative vapor pressure of 0.01 is 1.3 mol/mol-Si or more and that the amount of adsorption at a relative vapor pressure of 0.7 is 150 mg/g or more and 300 mg/g or less.

A transition-metal-containing zeolite according to the present invention has higher catalytic activity and hydrothermal durability, higher catalytic activity even after a water vapor adsorption and desorption cycle durability test, and higher stability during water adsorption and desorption than existing transition-metal-containing zeolites.

As compared with existing transition-metal-containing aluminophosphate zeolites, the present invention can increase the transition metal loading amount on a zeolite, transition metal dispersion, and zeolite stability, thereby increasing the number of transition metal catalytic active sites. Thus, the present invention can provide a transition-metal-containing zeolite having excellent catalytic performance, water resistance, high-temperature hydrothermal durability, and water vapor adsorption and desorption cycle durability.

DESCRIPTION OF EMBODIMENTS

Figure 1:
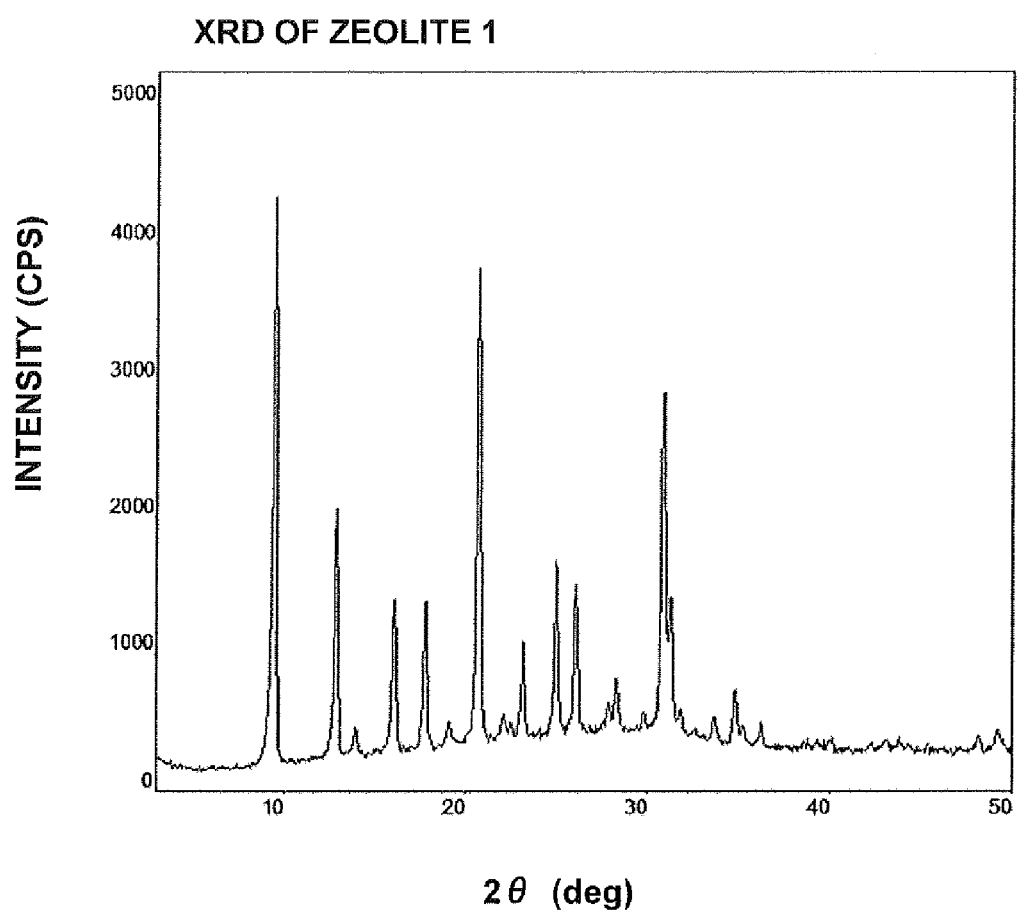
FIG. 1 is a chart of an XRD measurement for the zeolite 1 produced in Example 1.

Embodiments of the present invention will be described in detail below. The following description is an example (representative example) of the aspects of the present invention. The present invention is not limited to these contents.

[Method for Producing Transition-Metal-Containing Zeolite According to First Invention]

A method for producing a transition-metal-containing zeolite according to a first invention will be described below.

The method for producing a transition-metal-containing zeolite according to the first invention is a method for producing a transition-metal-containing zeolite that contains at least a silicon atom, a phosphorus atom, and an aluminum atom in its framework structure, including: hydrothermal synthesis using an aqueous gel containing a silicon atom raw material, an aluminum atom raw material, a phosphorus atom raw material, a transition metal raw material, and a polyamine (other than diamines). Unless otherwise specified, the term "polyamine" in the first invention refers to a "polyamine other than diamines".

The method according to the first invention is characterized in that the aqueous gel subjected to hydrothermal synthesis contains a transition metal source and a polyamine.

In the first invention, provided that the aqueous gel subjected to hydrothermal synthesis contains a transition metal source and a polyamine, the other manufacturing conditions are not particularly limited and may follow known zeolite hydrothermal synthesis methods. In general, an aluminum raw material, a silicon atom raw material, a phosphorus atom raw material, a transition metal raw material, and a polyamine are mixed to prepare an aqueous gel, which is subjected to hydrothermal synthesis. A known template may be added to the aqueous gel. The aqueous gel is subjected to hydrothermal synthesis by a common method and is then calcinated to remove the polyamine and other templates, thereby yielding a transition-metal-containing zeolite.

Although the reason that the method according to the first invention can provide a transition-metal-containing silicoaluminophosphate zeolite having excellent high-temperature hydrothermal durability is not clear, it may be surmised as described below.

Since the aqueous gel contains a polyamine together with a transition metal raw material, the transition metal in the aqueous gel is stabilized by strong interaction with the polyamine in the synthesis of the zeolite and rarely reacts with zeolite framework elements. Thus, unlike known methods for synthesizing a transition-metal-containing silicoaluminophosphate zeolite as described in Patent Document 1 and Non-patent Document 1, the transition metal is rarely incorporated into the zeolite framework (the transition metal rarely substitutes for a zeolite framework element) and can be dispersed on the outside of the zeolite framework, primarily in the pores of the zeolite. Thus, the first invention can provide a transition-metal-containing silicoaluminophosphate zeolite that has high catalytic performance and adsorption ability as well as excellent high-temperature hydrothermal durability.

One example of the method for producing a transition-metal-containing zeolite according to the first invention will be described below.

{Raw Materials}

The raw materials used in the preparation of the aqueous gel according to the first invention will be described below.

<Aluminum Atom Raw Material>

The aluminum atom raw material for the zeolite according to the first invention is not particularly limited and may generally be pseudo-boehmite, an aluminum alkoxide, such as aluminum isopropoxide or aluminum triethoxide, aluminum hydroxide, alumina sol, or sodium aluminate. These may be used alone or in combination. The aluminum atom raw material is preferably pseudo-boehmite for convenience in handling and high reactivity.

<Silicon Atom Raw Material>

The silicon atom raw material for the zeolite according to the first invention is not particularly limited and may generally be fumed silica, silica sol, colloidal silica, water glass, ethyl silicate, or methyl silicate. These may be used alone or in combination. The silicon atom raw material is preferably fumed silica because of its high purity and reactivity.

<Phosphorus Atom Raw Material>

The phosphorus atom raw material for the zeolite according to the first invention is generally phosphoric acid and may also be aluminum phosphate. The phosphorus atom raw material may be used alone or in combination.

<Transition Metal Raw Material>

The transition metal raw material to be contained in the zeolite according to the first invention is not particularly limited and may generally be an inorganic acid salt, such as sulfate, nitrate, phosphate, chloride, or bromide, an organic acid salt, such as acetate, oxalate, or citrate, or an organometallic compound, such as pentacarbonyl or ferrocene, of the transition metal. Among these, an inorganic acid salt or an organic acid salt is preferred in terms of water solubility. Colloidal oxide or an oxide fine powder may also be used.

Considering the characteristics required for use as an adsorbent or a catalyst, the transition metal may generally be, but is not limited to, a group 3-12 transition metal, such as iron, cobalt, magnesium, zinc, copper, palladium, iridium, platinum, silver, gold, cerium, lanthanum, praseodymium, titanium, or zirconium, preferably a group 8, 9, or 11 transition metal, such as iron, cobalt, or copper, more preferably a group 8 or 11 transition metal. One of these transition metals may be contained in the zeolite, or a combination of two or more of these transition metals may be contained in the zeolite. Among these transition metals, particularly preferred is iron and/or copper, and more particularly preferred is copper.

In the first invention, the transition metal raw material is a copper oxide or a copper salt, preferably copper (II) oxide or copper (II) acetate, more preferably copper (II) oxide.

The transition metal raw material may be a combination of two or more different transition metals or compounds.

<Polyamine>

The polyamine used in the first invention is preferably a polyamine having a general formula $H_2N-(C_nH_{2n}NH)_x-H$ (wherein n denotes an integer in the range of 2 to 6, and x denotes an integer in the range of 2 to 10).

In the general formula described above, n preferably denotes an integer in the range of 2 to 5, more preferably 2 to 4, still more preferably 2 or 3, particularly preferably 2. x preferably denotes an integer in the range of 2 to 6, more preferably 2 to 5, still more preferably 3 or 4, particularly preferably 4.

Such a polyamine may be inexpensive diethylenetriamine, triethylenetetramine, or tetraethylenepentamine, preferably triethylenetetramine, particularly preferably tetraethylenepentamine. These polyamines may be used alone or in combination. A branched polyamine may also be used.

<Template>

The aqueous gel according to the first invention may further contain an amine, an imine, or a quaternary ammonium salt, which is generally used as a template in the production of zeolite.

The template is preferably at least one compound selected from the group consisting of (1) alicyclic heterocyclic compounds containing a nitrogen atom as a heteroatom, (2) amines having an alkyl group (alkylamines), (3) amines having a cycloalkyl group (cycloalkylamines), and (4) tetraalkylammonium hydroxides.

These compounds are easily available and inexpensive and are suitable because the resulting silicoaluminophosphate zeolite is easy to handle and rarely undergoes structural disorders. Among these, (1) alicyclic heterocyclic compounds containing a nitrogen atom as a heteroatom, (2) alkylamines, and (3) cycloalkylamines are preferred. More preferably, one or more compounds selected from each of two or more of these three groups are used.

(1) Alicyclic Heterocyclic Compounds Containing Nitrogen Atom as Heteroatom

Each heterocyclic ring of the alicyclic heterocyclic compounds containing a nitrogen atom as a heteroatom is generally a 5-, 6-, or 7-membered ring, preferably a 6-membered ring. The number of heteroatoms of each heterocyclic ring is generally 3 or less, preferably 2 or less. The alicyclic heterocyclic compounds may contain a heteroatom other than the nitrogen atom and preferably contains an oxygen atom in addition to the nitrogen atom. The heteroatom(s) may take any position and are preferably not adjacent to each other.

The alicyclic heterocyclic compounds containing a nitrogen atom as a heteroatom generally have a molecular weight of 250 or less, preferably 200 or less, more preferably 150 or less, and generally 30 or more, preferably 40 or more, more preferably 50 or more.

Examples of the alicyclic heterocyclic compounds containing a nitrogen atom as a heteroatom include morpholine, N-methylmorpholine, piperidine, piperazine, N,N'-dimethylpiperazine, 1,4-diazabicyclo(2,2,2)octane, N-methylpiperidine, 3-methylpiperidine, quinuclidine, pyrrolidine, N-methylpyrrolidone, and hexamethyleneimine. These may be used alone or in combination. Among these, morpholine, hexamethyleneimine, and piperidine are preferred, and morpholine is particularly preferred.

(2) Alkylamines

Each alkyl group of the alkylamines is generally a linear alkyl group. The number of alkyl groups of the alkylamines is preferably, but is not limited to, 3 per molecule.

Each alkyl group of the alkylamines may have a substituent, such as a hydroxy group.

Each alkyl group of the alkylamines preferably has 4 or less carbon atoms. More preferably, the total number of carbon atoms of the alkyl group(s) is 5 or more and 30 or less per molecule.

The alkylamines generally have a molecular weight of 250 or less, preferably 200 or less, more preferably 150 or less.

Examples of the alkylamines include di-n-propylamine, tri-n-propylamine, tri-isopropylamine, triethylamine, triethanolamine, N,N-diethylethanolamine, N,N-dimethylethanolamine, N-methyldiethanolamine, N-methylethanolamine, di-n-butylamine, neopentylamine, di-n-pentylamine, isopropylamine, t-butylamine, ethylenediamine, di-isopropyl-ethylamine, and N-methyl-n-butylamine. These may be used alone or in combination. Among these, di-n-propylamine, tri-n-propylamine, tri-isopropylamine, triethylamine, di-n-butylamine, isopropylamine, t-butylamine, ethylenediamine, di-isopropyl-ethylamine, and N-methyl-n-butylamine are preferred, and triethylamine is particularly preferred.

(3) Cycloalkylamines

The number of carbon atoms of each alkyl group of cycloalkylamines is preferably 4 or more and 10 or less. Among others, cyclohexylamine is preferred. The cycloalkylamines may be used alone or in combination.

(4) Tetraalkylammonium Hydroxides

The tetraalkylammonium hydroxides preferably have four alkyl groups having 4 or less carbon atoms. The tetraalkylammonium hydroxides may be used alone or in combination.

When a combination of two or more templates, any combination may be used. Two or more of morpholine, triethylamine, and cyclohexylamine, particularly the combination of morpholine and triethylamine, are preferably used in combination.

The mixing ratio of these template groups depends on the conditions. When two templates are mixed, the molar ratio of the two templates is in the range of 1:20 to 20:1, preferably 1:10 to 10:1, more preferably 1:5 to 5:1. When three templates are mixed, the molar ratio of a third template to the two templates mixed at the molar ratio described above is in the range of 1:20 to 20:1, preferably 1:10 to 10:1, more preferably 1:5 to 5:1.

Although such known templates may not be used in the first invention, a transition-metal-containing aluminophosphate zeolite having higher high-temperature hydrothermal durability can be produced by using the templates.

{Preparation of Aqueous Gel}

The aqueous gel is prepared by mixing the silicon atom raw material, the aluminum atom raw material, the phosphorus atom raw material, the transition metal raw material, the polyamine, and an optional template with water.

The composition of the aqueous gel used in the first invention preferably has the molar ratios of the silicon atom raw material, the aluminum atom raw material, the phosphorus atom raw material, and the transition metal raw material on an oxide basis as described below.

The $SiO_2/Al_2O_3$ ratio is generally more than 0, preferably 0.1 or more, preferably 0.8 or less, more preferably 0.6 or less, still more preferably 0.4 or less, particularly preferably 0.3 or less.

The $P_2O_5/Al_2O_3$ ratios is generally 0.6 or more, preferably 0.7 or more, more preferably 0.8 or more, and generally 1.3 or less, preferably 1.2 or less, more preferably 1.1 or less.

The $M_aO_b/Al_2O_3$ ratio (wherein a and b denote the atomic ratios of M and O, respectively) is generally 0.01 or more, preferably 0.03 or more, more preferably 0.05 or more, and generally 1 or less, preferably 0.8 or less, more preferably 0.4 or less, still more preferably 0.3 or less.

When the $SiO_2/Al_2O_3$ ratio is higher than the upper limit, this results in a low degree of crystallinity or insufficient hydrothermal durability.

When the $P_2O_5/Al_2O_3$ ratio is lower than the lower limit, this results in a low degree of crystallinity or insufficient hydrothermal durability. When the $P_2O_5/Al_2O_3$ ratio is higher than the upper limit, this also results in a low degree of crystallinity or insufficient hydrothermal durability.

The composition of zeolite produced by hydrothermal synthesis correlates with the composition of the aqueous gel. Thus, in order to produce a zeolite having a desired composition, the composition of the aqueous gel is appropriately determined in the ranges described above.

When the $M_aO_b/Al_2O_3$ ratio is lower than the lower limit, this results in insufficient loading of the transition metal on the zeolite. When the $M_aO_b/Al_2O_3$ ratio is higher than the upper limit, this results in a low degree of crystallinity or insufficient hydrothermal durability.

In the presence of a template, the polyamine content of the aqueous gel should be sufficient to stabilize the transition metal raw material. In the absence of a template, since the polyamine also acts as a template, the polyamine content of the aqueous gel should be sufficient so that the polyamine functions as a template.

More specifically, the aqueous gel preferably has the following polyamine content.

<In the Presence of Template>

In the presence of a template, the total content of the polyamine and the template of the aqueous gel is such that the molar ratio of the total of the polyamine and the template to the aluminum atom raw material on an oxide ($Al_2O_3$) basis in the aqueous gel is generally 0.2 or more, preferably 0.5 or more, more preferably 1 or more, and generally 4 or less, preferably 3 or less, more preferably 2.5 or less.

When the total content of the polyamine and the template is lower than the lower limit, this results in a low degree of crystallinity or insufficient hydrothermal durability. When the total content of the polyamine and the template is higher than the upper limit, this results in an insufficient yield of the zeolite.

The polyamine is preferably used such that the molar ratio of the polyamine to the transition metal raw material on an oxide ($M_aO_b$) basis is generally 0.1 or more, preferably 0.5 or more, more preferably 0.8 or more, and generally 10 or less, preferably 5 or less, more preferably 4 or less.

When the polyamine content of the aqueous gel is lower than the lower limit, the advantages of the present invention using the polyamine are insufficient. When the polyamine content of the aqueous gel is higher than the upper limit, this results in an insufficient yield of the zeolite.

<In the Absence of Template>

In the absence of a template, because of the same reason as described above, the polyamine content of the aqueous gel is preferably such that the molar ratio of the polyamine to the aluminum atom raw material on an oxide ($Al_2O_3$) basis in the aqueous gel is generally 0.2 or more, preferably 0.5 or more, more preferably 1 or more, and generally 4 or less, preferably 3 or less, more preferably 2.5 or less, and such that the molar ratio of the polyamine to the transition metal raw material on an oxide ($M_aO_b$) basis is generally 1 or more, preferably 5 or more, more preferably 10 or more, and generally 50 or less, preferably 30 or less, more preferably 20 or less.

As described above, the template is appropriately selected for given conditions. For example, when morpholine and triethylamine are used in combination as templates, the morpholine/triethylamine molar ratio is preferably in the range of 0.05 to 20, more preferably 0.1 to 10, still more preferably 0.2 to 9.

One or more templates selected from each of the two or more groups may be mixed in any order. The templates may be mixed with each other before mixed with other material(s), or each of the templates may be mixed with other material(s).

In terms of ease with which the zeolite can be synthesized and productivity, the water content of the aqueous gel is such that the molar ratio of water to the aluminum atom raw material on an oxide ($Al_2O_3$) basis is generally 3 or more, preferably 5 or more, more preferably 10 or more, and generally 200 or less, preferably 150 or less, more preferably 120 or less.

The pH of the aqueous gel is generally 5 or more, preferably 6 or more, more preferably 6.5 or more, and generally 11 or less, preferably 10 or less, more preferably 9 or less.

If desired, the aqueous gel may contain another component. Such a component may be an alkali metal or alkaline-earth metal hydroxide or salt or a hydrophilic organic solvent, such as an alcohol. The amount of such a component in the aqueous gel is such that the molar ratio of the alkali metal or alkaline-earth metal hydroxide or salt to the aluminum atom raw material on an oxide ($Al_2O_3$) basis is generally 0.2 or less, preferably 0.1 or less, and such that the molar ratio of the hydrophilic organic solvent, such as an alcohol, to water in the aqueous gel is generally 0.5 or less, preferably 0.3 or less.

In the preparation of the aqueous gel, the mixing sequence of the raw materials is not particularly limited and may be appropriately determined for given conditions. In general, water is mixed with the phosphorus atom raw material and the aluminum atom raw material, and then the mixture is mixed with the silicon atom raw material and the template(s). The transition metal raw material and the polyamine may be added to the mixture at any time. The transition metal raw material and the polyamine are preferably mixed with each other in advance because this effectively stabilizes the transition metal raw material by the formation of a complex with the polyamine.

Alternatively, the transition metal raw material may be dissolved in a small amount of water and a phosphorus atom raw material, such as phosphoric acid, and then another raw material may be added to the solution. This method can increase the yield and the amount of transition metal by decreasing the amount of water and is preferred when the transition metal content is 4% by weight or more of the transition-metal-containing zeolite. This method is also preferred in terms of the performance of the transition-metal-containing zeolite used as a catalyst or an adsorbent. The term "a small amount of water", as used herein, means that the molar ratio of water to the aluminum atom raw material on an $Al_2O_3$ basis is preferably 50 or less, more preferably 40 or less, still more preferably 35 or less.

{Hydrothermal Synthesis}

Hydrothermal synthesis is performed by charging the aqueous gel thus prepared in a pressure vessel and maintaining a predetermined temperature while the aqueous gel is stirred or left still under autogenous pressure or under a gas pressure at which crystallization is not inhibited.

The reaction temperature in the hydrothermal synthesis is generally 100° C. or more, preferably 120° C. or more, more preferably 150° C. or more, and generally 300° C. or less, preferably 250° C. or less, more preferably 220° C. or less. The reaction time is generally 2 hours or more, preferably 3 hours or more, more preferably 5 hours or more, and generally 30 days or less, preferably 10 days or less, more preferably 4 days or less. The reaction temperature may be constant during the reaction or may be stepwise or continuously changed.

{Zeolite Containing Template(s) etc.}

After the hydrothermal synthesis, the resulting product zeolite containing the polyamine and the optional template(s) ("the polyamine" or "the polyamine and the template(s)" are hereinafter referred to as "template(s) etc.") is separated from the hydrothermal synthetic reaction solution. The zeolite containing the template(s) etc. may be separated from the hydrothermal synthetic reaction solution by any method. In general, the zeolite may be separated by filtration or decantation, washed with water, and dried at room temperature or a temperature of 150° C. or less to yield the zeolite containing the template(s) etc.

In general, the template(s) etc. are then removed from the zeolite containing the template(s) etc. separated from the hydrothermal synthetic reaction solution. The template(s) etc. may be removed by any method. In general, organic substances (template(s) etc.) contained in the zeolite may be removed by calcinating in an inert gas atmosphere containing air or oxygen or in an inert gas atmosphere at a temperature in the range of 300° C. to 1000° C. or by extraction using an extracting solvent, such as aqueous ethanol or HCl-containing ether.

Preferably, the template(s) etc. are removed by calcinating in terms of productivity. In this case, the calcinating temperature is preferably in the range of 400° C. to 900° C., more preferably 450° C. to 850° C., still more preferably 500° C. to 800° C.

[Transition-Metal-Containing Zeolite According to Second Invention]

A transition-metal-containing zeolite having particular water adsorption ability according to a second invention will be described below.

The transition-metal-containing zeolite may be used as an exhaust gas treatment catalyst. An exhaust gas emitted from diesel engines of vehicles contains water, which constitutes 5% to 15% by volume of the exhaust gas. While the vehicle is moving, the exhaust gas has a high temperature of 200° C. or more, and the relative humidity decreases to 5% or less. Thus, the catalyst desorbs water. When the vehicle is stationary, since the relative humidity of the air is 30% or more, particularly 50% or more in summer, the catalyst adsorbs water in the air. Thus, when the vehicle is moving or stationary, zeolite of the transition-metal-containing zeolite catalyst adsorbs or desorbs water.

A zeolite that can adsorb a large amount of water at low humidity (5% or less) and a small amount of water at high humidity (50% or more) is less prone to water adsorption and desorption with variations in humidity of the operating environment. This reduces variations in bond angle and bond length of the framework element bonds Si—O—Al and Al—O—P caused by water adsorption and desorption. This can increase the stability of the zeolite and reduce variations in lattice constant and volume of the zeolite caused by water adsorption and desorption. This can solve the problem of breakage of a honeycomb unit containing a silicoaluminophosphate zeolite caused by water adsorption and desorption.

In a water vapor adsorption isotherm measured at 25° C., the amount of water adsorption at a relative vapor pressure of 0.01 (relative humidity of 1%) depends greatly on the Si content of zeolite. In general, a high Si content results in an increase in the amount of water adsorption at a relative vapor pressure of 0.01. Water adsorption at a relative vapor pressure of 0.01 probably results from a hydrogen bond between a water molecule and a hydrogen atom of a Si—O(H)—Al bond derived from Si in zeolite. Thus, the amount of water adsorption of the transition-metal-containing zeolite according to the second invention at a relative vapor pressure of 0.01 is defined by the number of moles of water adsorbed to 1 mol of Si in the zeolite (mol/mol-Si). More specifically, the amount of water adsorption at a relative vapor pressure of 0.01 (relative humidity 1%) is preferably 1.3 mol/mol-Si or more, more preferably 1.4 mol/mol-Si or more. The amount of water adsorption at a relative vapor pressure of 0.01 has no upper limit. When the amount of adsorption is lower than the lower limit, the zeolite desorbs a large amount of water at low humidity, which reduces the stability of the zeolite framework element bonds.

In a water vapor adsorption isotherm measured at 25° C., it is believed that the water adsorption of zeolite at a relative vapor pressure of 0.7 (relative humidity of 70%) is substantially constant and is saturated. The amount of water adsorption of zeolite in saturation is independent of the Si content of the zeolite but depends on the pore volume of the zeolite or the hydrophilicity of the surface of the zeolite.

The amount of water adsorption of the transition-metal-containing zeolite according to the second invention at a relative vapor pressure of 0.7 is preferably 150 mg or more and 300 mg or less, more preferably 200 mg or more, and still more preferably 260 mg or more and 290 mg or less, per gram of the zeolite.

When the amount of water adsorption of the transition-metal-containing zeolite at a relative vapor pressure of 0.7 (relative humidity of 70%) is higher than the upper limit, a change in operating environment from high humidity to low humidity causes a marked increase in water desorption on the zeolite, which reduces the stability of the zeolite framework element bonds.

A honeycomb unit containing a silicoaluminophosphate zeolite that greatly changes its lattice constant or volume with water adsorption and desorption tends to be damaged by water adsorption and desorption. In the case that mesopores are formed in zeolite crystals, the zeolite may adsorb more water than the upper limit at a relative vapor pressure of 0.7. Such a zeolite may have low hydrothermal stability. When the amount of water adsorption of the transition-metal-containing zeolite at a relative vapor pressure of 0.7

(relative humidity of 70%) is lower than the lower limit, the zeolite has a low degree of crystallinity and poor catalytic performance.

Although the transition-metal-containing zeolite according to the second invention has been described with respect to its application to automobile exhaust gas treatment, it goes without saying that the transition-metal-containing zeolite can also be applied to remove nitrogen oxides contained in a wide variety of exhaust gases emitted from various stationary diesel engines, boilers, and gas turbines for use in stationary power generation, ships, agricultural machinery, construction equipment, two-wheeled vehicles, and aircrafts, provided that the transition-metal-containing zeolite has the characteristics described above.

An exhaust gas to which the transition-metal-containing zeolite according to the second invention is applied is preferably an exhaust gas containing nitrogen oxides (NOx). Such an exhaust gas may contain another component other than nitrogen oxides, for example, a hydrocarbon, carbon monoxide, carbon dioxide, hydrogen, nitrogen, oxygen, sulfur oxides, and/or water. When nitrogen oxides (NOx) are removed with a known reducing agent, for example, a hydrocarbon or a nitrogen-containing compound, such as ammonia or urea, the exhaust gas may contain the reducing agent.

The transition-metal-containing zeolite according to the second invention and a transition-metal-containing zeolite produced by the method for producing a transition-metal-containing zeolite according to the first invention (a transition-metal-containing zeolite according to the present invention produced by a method for producing a transition-metal-containing zeolite according to the present invention is hereinafter referred to as a "transition-metal-containing zeolite according to the first invention") are preferably transition-metal-containing silicoaluminophosphate zeolites that contain a transition metal in a zeolite having the following molar ratios of an aluminum atom, a phosphorus atom, and a silicon atom of the zeolite framework structure.

The ratios between an aluminum atom, a phosphorus atom, and a silicon atom contained in the framework structure of the transition-metal-containing zeolites according to the first invention and the second invention preferably satisfy the following formulae (I), (II), and (III).

$$0.001 \leq x \leq 0.3 \tag{I}$$

(wherein x denotes the molar ratio of the silicon atom to the total of the silicon atom, the aluminum atom, and the phosphorus atom of the framework structure)

$$0.3 \leq y \leq 0.6 \tag{II}$$

(wherein y denotes the molar ratio of the aluminum atom to the total of the silicon atom, the aluminum atom, and the phosphorus atom of the framework structure)

$$0.3 \leq z \leq 0.6 \tag{III}$$

(wherein z denotes the molar ratio of the phosphorus atom to the total of the silicon atom, the aluminum atom, and the phosphorus atom of the framework structure)

The value x is generally 0.001 or more, preferably 0.01 or more, more preferably 0.03 or more, and generally 0.3 or less, preferably 0.2 or less, more preferably 0.18 or less. A value x lower than the lower limit may result in difficult crystallization of the zeolite. A value x higher than the upper limit tends to result in impurity contamination during synthesis.

The value y is generally 0.3 or more, preferably 0.35 or more, more preferably 0.4 or more, and generally 0.6 or less, preferably 0.55 or less. A value y lower than the lower limit or higher than the upper limit tends to result in impurity contamination during synthesis.

z is generally 0.3 or more, preferably 0.35 or more, more preferably 0.4 or more, and generally 0.6 or less, preferably 0.55 or less, more preferably 0.50 or less. A value z lower than the lower limit tends to result in impurity contamination during synthesis. A value z higher than the upper limit may result in difficult crystallization of the zeolite.

Considering the characteristics required for use as an adsorbent or a catalyst, the transition metal may generally be, but is not limited to, a group 3-12 transition metal, such as iron, cobalt, magnesium, zinc, copper, palladium, iridium, platinum, silver, gold, cerium, lanthanum, praseodymium, titanium, or zirconium, preferably a group 8, 9, or 11 transition metal, such as iron, cobalt, or copper, more preferably a group 8 or 11 transition metal. One of these transition metals may be contained in the zeolite, or a combination of two or more of these transition metals may be contained in the zeolite. Among these transition metals, particularly preferred is iron and/or copper, and more particularly preferred is copper.

The amount of transition metal atom of the transition-metal-containing zeolites according to the first invention and the second invention preferably satisfies the following formula (IV).

$$0.001 \leq m \leq 0.3 \tag{IV}$$

(wherein m denotes the molar ratio of the transition metal to the total of the silicon atom, the aluminum atom, and the phosphorus atom of the zeolite framework structure)

The value m is generally 0.001 or more, preferably 0.01 or more, more preferably 0.05 or more, still more preferably 0.08 or more, particularly preferably 0.1 or more, and generally 0.3 or less, preferably 0.25 or less, more preferably 0.2 or less. A value m lower than the lower limit tends to result in a reduced number of active sites and may result in poor catalytic performance. A value m higher than the upper limit tends to result in marked aggregation of the transition metal and may result in poor catalytic performance.

The composition of the transition-metal-containing zeolites according to the first invention and the second invention preferably has the molar ratios of the aluminum atom, the silicon atom, the phosphorus atom, and the transition metal on an oxide basis as described below.

The $SiO_2/Al_2O_3$ ratio is generally more than 0, preferably 0.1 or more, preferably 0.8 or less, more preferably 0.6 or less, still more preferably 0.4 or less, particularly preferably 0.3 or less.

The $P_2O_5/Al_2O_3$ ratios is generally 0.6 or more, preferably 0.7 or more, more preferably 0.8 or more, and generally 1.3 or less, preferably 1.2 or less, more preferably 1.1 or less.

The $M_aO_b/Al_2O_3$ ratio (wherein a and b denote the atomic ratios of M and O, respectively) is generally 0.01 or more, preferably 0.03 or more, more preferably 0.05 or more, and generally 1 or less, preferably 0.8 or less, more preferably 0.4 or less, still more preferably 0.3 or less.

When the $SiO_2/Al_2O_3$ ratio is higher than the upper limit, this results in a low degree of crystallinity or insufficient hydrothermal durability.

When the $P_2O_5/Al_2O_3$ ratio is lower than the lower limit, this results in a low degree of crystallinity or insufficient hydrothermal durability. When the $P_2O_5/Al_2O_3$ ratio is higher than the upper limit, this also results in a low degree of crystallinity or insufficient hydrothermal durability.

When the $M_aO_b/Al_2O_3$ ratio is lower than the lower limit, this results in insufficient loading of the transition metal on the zeolite. When the $M_aO_b/Al_2O_3$ ratio is higher than the upper limit, this results in a low degree of crystallinity or insufficient hydrothermal durability.

The transition-metal-containing zeolite according to the first invention produced by the method for producing a transition-metal-containing zeolite according to the first invention is also preferably produced from an aqueous gel containing an aluminum atom raw material, a silicon atom raw material, a phosphorus atom raw material, and a transition metal raw material at the same composition as described above. In this case, the transition-metal-containing zeolite contains the aluminum atom, the silicon atom, the phosphorus atom, and the transition metal at the ratios described above.

The amounts of atoms of the zeolite framework structure and transition metal M are determined by elementary analysis. In the elementary analysis in the present invention, a sample is dissolved in aqueous hydrochloric acid by the application of heat and is subjected to inductively coupled plasma (ICP) spectroscopy, or a sample is formed into a tablet and is subjected to X-ray fluorescence analysis (XRF), thereby determining the amount $W_1$ (% by weight) of atoms of the zeolite framework structure or transition metal M. At the same time, the water content $W_{H2O}$ (% by weight) of the sample is measured by thermogravimetric analysis (TG). The amount W (% by weight) of atoms or transition metal M of the framework structure of the transition-metal-containing zeolite in an anhydrous state is calculated using the following equation (V).

$$W=W_1/(1-W_{H2O}) \quad (V)$$

When the transition-metal-containing zeolites according to the first invention and the second invention are used as automobile exhaust-gas purification catalysts or water vapor adsorbents, among the transition-metal-containing zeolites according to the first invention and the second invention, a transition-metal-containing zeolite having the following structure and framework density is preferred.

The structure of zeolite is determined by X-ray diffraction (XRD) and is classified into AEI, AFR, AFS, AFT, AFX, AFY, AHT, CHA, DFO, ERI, FAU, GIS, LEV, LTA, and VFI in accordance with the codes defined by the International Zeolite Association (IZA). A zeolite having a structure of AEI, AFX, GIS, CHA, VFI, AFS, LTA, FAU, or AFY is preferred, and a zeolite having a structure of CHA is most preferred.

The framework density is a parameter that reflects the crystal structure and is preferably 10.0 T/1000 cubic angstroms or more, and generally 16.0 T/1000 cubic angstroms or less, preferably 15.0 T/1000 cubic angstroms or less, in accordance with ATLAS OF ZEOLITE FRAMEWORK TYPES Fifth Revised Edition 2001 by IZA.

The framework density (T/1000 cubic angstroms) refers to the number of T atoms (atoms constituting the zeolite framework structure other than oxygen atoms (T atoms)) per unit volume of zeolite of 1000 cubic angstroms and depends on the zeolite structure.

When zeolite has a framework density lower than the lower limit, its structure may be unstable, or its durability tends to be reduced. When zeolite has a framework density higher than the upper limit, the amount of adsorption or catalytic activity may be reduced, or the zeolite may be unsuitable as a catalyst.

The particle size of the transition-metal-containing zeolites according to the first invention and the second invention is not particularly limited and is generally 0.1 µm or more, preferably 1 µm or more, more preferably 3 µm or more, and generally 30 µm or less, preferably 20 µm or less, more preferably 15 µm or less.

The particle size of a transition-metal-containing zeolite in the present invention refers to the average primary particle size of 10 to 30 zeolite particles observed with an electron microscope. In a method for producing a transition-metal-containing zeolite according to the present invention, the particle size is measured after the template(s) etc. are removed.

The transition-metal-containing zeolite according to the second invention may be produced by any method, provided that the transition-metal-containing zeolite has the characteristic water vapor adsorption isotherm described above. The transition-metal-containing zeolite according to the second invention is preferably produced by the method for producing a transition-metal-containing zeolite according to the first invention in terms of simplicity and efficiency.

[Transition-Metal-Containing Zeolite According to Third Invention]

A transition-metal-containing zeolite according to a third invention may be produced by any method, provided that the transition-metal-containing zeolite has characteristic transition metal dispersion defined by the third invention at a transition metal content defined by the third invention.

Thus, the transition-metal-containing zeolite according to the third invention may be produced by the method for producing a transition-metal-containing zeolite according to the first invention. However, a method for producing the transition-metal-containing zeolite according to the third invention is not limited to the method for producing a transition-metal-containing zeolite according to the first invention.

<Framework Structure of Zeolite>

The transition-metal-containing zeolite according to the third invention is an aluminophosphate zeolite containing at least a phosphorus atom and an aluminum atom in its framework structure and containing a transition metal and preferably further containing a silicon atom in its framework structure. In particular, the transition-metal-containing zeolite according to the third invention is preferably a transition-metal-containing siliconaluminophosphate zeolite that contains the following amount of transition metal M in a zeolite having the following molar ratios of an aluminum atom, a phosphorus atom, and a silicon atom of the zeolite framework structure.

The ratios between an aluminum atom, a phosphorus atom, and a silicon atom contained in the framework structure of the transition-metal-containing zeolite according to the third invention preferably satisfy the following formulae (I), (II), (III), and (IV).

$$0.001 \leq x \leq 0.3 \quad (I)$$

(wherein x denotes the molar ratio of the silicon atom to the total of the silicon atom, the aluminum atom, and the phosphorus atom of the framework structure)

$$0.3 \leq y \leq 0.6 \quad (II)$$

(wherein y denotes the molar ratio of the aluminum atom to the total of the silicon atom, the aluminum atom, and the phosphorus atom of the framework structure)

$$0.3 \leq z \leq 0.6 \quad (III)$$

(wherein z denotes the molar ratio of the phosphorus atom to the total of the silicon atom, the aluminum atom, and the phosphorus atom of the framework structure)

$$0.9 \leq y/(x+z) \leq 1.5 \quad (IV)$$

(wherein y/(x+z) denotes the molar ratio of the aluminum atom to the total of the silicon atom and the phosphorus atom of the framework structure)

The value x is generally 0.001 or more, preferably 0.01 or more, more preferably 0.03 or more, and generally 0.3 or less, preferably 0.2 or less, more preferably 0.18 or less. A value x lower than the lower limit may result in difficult crystallization of the zeolite. A value x higher than the upper limit tends to result in impurity contamination during synthesis.

The value y is generally 0.3 or more, preferably 0.35 or more, more preferably 0.4 or more, and generally 0.6 or less, preferably 0.55 or less. A value y lower than the lower limit or higher than the upper limit tends to result in impurity contamination during synthesis.

z is generally 0.3 or more, preferably 0.35 or more, more preferably 0.4 or more, and generally 0.6 or less, preferably 0.55 or less, more preferably 0.50 or less. A value z lower than the lower limit tends to result in impurity contamination during synthesis. A value z higher than the upper limit may result in difficult crystallization of the zeolite.

The value y/(x+z) is generally 0.9 or more, preferably 0.93 or more, more preferably 0.96 or more, still more preferably 0.98 or more, and generally 1.5 or less, preferably 1.3 or less, more preferably 1.1 or less. When a transition-metal-containing aluminophosphate zeolite is synthesized by introducing a transition metal M raw material into a gel in a zeolite synthesis process, y/(x+z) lower than the lower limit results in the introduction of the transition metal M into the zeolite framework structure, making the zeolite structure unstable. A value y/(x+z) higher than the upper limit also tends to result in an unstable zeolite structure. Thus, a zeolite containing the transition metal M in its framework structure has low hydrothermal stability in high-temperature hydrothermal treatment or poor durability in water vapor adsorption and desorption cycles.

<Transition Metal M>

Considering the characteristics required for use as an adsorbent or a catalyst, the transition metal M may generally be, but is not limited to, a group 3-12 transition metal, such as iron, cobalt, magnesium, zinc, copper, palladium, iridium, platinum, silver, gold, cerium, lanthanum, praseodymium, titanium, or zirconium, preferably a group 8, 9, or 11 transition metal, such as iron, cobalt, or copper, more preferably a group 8 or 11 transition metal. One of these transition metals may be contained in the zeolite, or a combination of two or more of these transition metals may be contained in the zeolite. Among these transition metals, particularly preferred is iron and/or copper, and more particularly preferred is copper.

The transition metal M content of the transition-metal-containing zeolite according to the third invention is 3% or more, preferably 3.5% or more, more preferably 4% or more, and generally 10% or less, preferably 8% or less, more preferably 6% or less, of the weight of the transition-metal-containing zeolite in an anhydrous state. A transition metal M content lower than the lower limit results in an insufficient number of dispersive transition metal active sites. A transition metal M content higher than the upper limit may result in difficult crystallization of the zeolite.

The amounts of atoms and transition metal M of the zeolite framework structure are determined by elementary analysis. In the elementary analysis in the present invention, as described above, a sample is dissolved in aqueous hydrochloric acid by the application of heat and is subjected to inductively coupled plasma (ICP) spectroscopy, or a sample is formed into a tablet and is subjected to X-ray fluorescence analysis (XRF), thereby determining the amount $W_1$ (% by weight) of atoms or transition metal M of the zeolite framework structure. At the same time, the water content $W_{H2O}$ (% by weight) of the sample is measured by thermogravimetric analysis (TG). The amount W (% by weight) of atoms or transition metal M of the framework structure of the transition-metal-containing zeolite in an anhydrous state is calculated using the following equation (V).

$$W = W_1/(1 - W_{H2O}) \quad (V)$$

<Coefficient of Variation in Intensity of Transition Metal M>

The transition-metal-containing zeolite according to the third invention is characterized in that element mapping of the transition metal M measured with an electron probe microanalyzer (EPMA) shows that the coefficient of variation in intensity of the metallic element M is generally 33% or less. The coefficient of variation is preferably 31% or less, more preferably 29% or less.

The coefficient of variation in intensity of the transition metal M in the transition-metal-containing zeolite according to the third invention has no particular lower limit. A lower coefficient of variation in intensity of the transition metal M indicates that the transition metal M in the zeolite is more uniformly dispersed over exchange sites derived from Si. When the coefficient of variation in intensity of the transition metal M is higher than the upper limit, this results in poor dispersion of the transition metal M in the zeolite, insufficient catalytic activity of the transition-metal-containing zeolite, or low stability of the zeolite.

In the third invention, the coefficient of variation is an average coefficient of variation of intensities measured at three or more visual fields. More specifically, element mapping measured with EPMA is performed by a method described below in the examples.

<BET Specific Surface Area>

The BET specific surface area of the transition-metal-containing zeolite according to the third invention has no particular upper limit but preferably has a lower limit of 500 m$^2$/g or more, more preferably 550 m$^2$/g or more, particularly preferably 600 m$^2$/g or more. A BET specific surface area lower than the lower limit tends to result in a low degree of crystallinity and poor performance, such as low catalytic activity, of the zeolite.

<Structure and Framework Density>

When the transition-metal-containing zeolite according to the third invention is used as an automobile exhaust-gas purification catalyst or a water vapor adsorbent, the transition-metal-containing zeolite according to the third invention preferably has the following structure and framework density.

The structure of the zeolite is determined by X-ray diffraction (XRD). The transition-metal-containing zeolite according to the present invention is preferably a zeolite having an 8-membered ring structure in its framework structure in terms of structural stability and is AEI, AFR, AFS, AFT, AFX, AFY, AHT, CHA, DFO, ERI, FAU, GIS, LEV, LTA, or VFI in accordance with the codes defined by the International Zeolite Association (IZA), preferably AEI, AFX, GIS, CHA, VFI, AFS, LTA, FAU, or AFY, most preferably a zeolite having a CHA structure.

The framework density is a parameter that reflects the crystal structure and is preferably 10.0 T/1000 cubic angstroms or more, and generally 16.0 T/1000 cubic angstroms or less, preferably 15.0 T/1000 cubic angstroms or less, in accordance with ATLAS OF ZEOLITE FRAMEWORK TYPES Fifth Revised Edition 2001 by IZA.

The framework density (T/1000 cubic angstroms) refers to the number of T atoms (atoms constituting the zeolite framework structure other than oxygen atoms (T atoms)) per unit volume of zeolite of 1000 cubic angstroms and depends on the zeolite structure.

When zeolite has a framework density lower than the lower limit, its structure may be unstable, or its durability tends to be reduced. When zeolite has a framework density higher than the upper limit, the amount of adsorption or catalytic activity may be reduced, or the zeolite may be unsuitable as a catalyst.

<Particle Size>

The particle size of the transition-metal-containing zeolite according to the third invention is not particularly limited and is generally 0.1 µm or more, preferably 1 µm or more, more preferably 3 µm or more, and generally 30 µm or less, preferably 20 µm or less, more preferably 15 µm or less.

The term "particle size of a transition-metal-containing zeolite", as used herein, refers to an average primary particle size of 10 to 30 zeolite particles observed with an electron microscope.

<Method for Producing Transition-Metal-Containing Zeolite>

The transition-metal-containing zeolite according to the third invention may be produced by any method, for example, the following method.

First, an aqueous gel containing a silicon atom raw material, an aluminum atom raw material, a phosphorus atom raw material, a transition metal atom raw material, and a polyamine is prepared. The polyamine also serves as a template for a zeolite having a desired framework structure (for example, an 8-membered ring structure). Thus, the aqueous gel may be prepared without using a template (a structure-directing agent (SDA)). Nevertheless, a known template other than the polyamine may be used to produce a zeolite having a desired framework structure. The aqueous gel is then subjected to hydrothermal synthesis. After the hydrothermal synthesis, the polyamine and another template are removed to produce the transition-metal-containing zeolite according to the third invention.

A method for preparing an aqueous gel using a polyamine is effective for the method for producing the transition-metal-containing zeolite according to the third invention, which has a coefficient of variation in intensity of the transition metal M of 33% or less in the element mapping measured with EPMA. By using this method, the transition-metal-containing aluminophosphate zeolite according to the third invention having excellent high-temperature hydrothermal durability and repetitive hydrothermal durability can be easily and efficiently produced. The reason for this is not clear but is supposed as described below.

For example, in the synthesis of the zeolite, the transition metal interacts strongly with the polyamine and rarely reacts with zeolite framework elements. Thus, the transition metal is rarely incorporated into the framework of the zeolite and can be located only in the pores of the zeolite. Thus, unlike transition-metal-containing aluminophosphate zeolites synthesized by conventional methods, the transition metal rarely substitutes for a zeolite framework element and can be uniformly dispersed in the zeolite pores.

The details of this production method are the same as the method for producing a transition-metal-containing zeolite according to the first invention. The polyamine is a polyamine having two or more amino groups per molecule (including cyclic or chain (including straight or branched chain)), preferably a polyamine compound having extended chains containing 2 or more NH groups represented by a general formula $H_2N-(C_nH_{2n}NH)_x-H$ (wherein n denotes an integer in the range of 2 to 6, and x denotes an integer in the range of 1 to 10), particularly inexpensive diethylenetriamine, triethylenetetramine, or tetraethylenepentamine. The polyamine compound having the general formula may be a mixture of a branched amine and a plurality of amines having different x's.

In the preparation of the aqueous gel, the raw materials may be mixed in any order, which may be appropriately selected for given conditions. Water may be first mixed with the phosphorus atom raw material and the aluminum atom raw material and then with the silicon source and template(s). The transition metal atom raw material and the polyamine may be added at any point during the mixing. Alternatively, the transition metal atom raw material may be dissolved in a small amount of water and a phosphorus atom raw material, such as phosphoric acid, and then another raw material may be added to the solution. The latter method is preferred because it can reduce the amount of water and increase the yield and the resulting transition-metal-containing zeolite exhibits excellent performance as a catalyst or an adsorbent. The term "a small amount of water", as used herein, means that the molar ratio of water to the aluminum atom raw material on an $Al_2O_3$ basis is preferably 50 or less, more preferably 40 or less, still more preferably 35 or less.

When the transition metal atom raw material is mixed with the polyamine in advance, the polyamine can effectively stabilize the transition metal atom raw material by the formation of a complex therebetween.

[Uses of Transition-Metal-Containing Zeolite]

Uses of the transition-metal-containing zeolites according to the first invention, the second invention, and the third invention (these are hereinafter collectively referred to as a "transition-metal-containing zeolite according to the present invention") are not particularly limited. A transition-metal-containing zeolite according to the present invention is suitably used as an exhaust-gas purification catalyst and/or a water vapor adsorbent for vehicles because of its excellent water resistance, excellent high-temperature hydrothermal durability, high catalytic activity, and highly stable catalytic activity after water vapor adsorption and desorption cycles.

<Exhaust Gas Treatment Catalyst>

For example, when a transition-metal-containing zeolite according to the present invention is used as an exhaust gas treatment catalyst, such as an automobile exhaust-gas purification catalyst, the transition-metal-containing zeolite may be directly used in the form of powder or may be mixed with a binder, such as silica, alumina, or clay mineral, and subjected to granulation or forming before use. A transition-metal-containing zeolite according to the present invention may be formed into a predetermined shape, preferably a honeycomb shape, by a coating method or a forming method.

In the case that a formed catalyst containing a transition-metal-containing zeolite according to the present invention is formed by a coating method, in general, a transition-metal-containing zeolite is mixed with an inorganic binder, such as silica or alumina, to prepare a slurry. The slurry is applied to a surface of a formed product made of an inorganic substance, such as cordierite, and is calcinated to yield the formed catalyst. Preferably, the slurry can be applied to a formed product of a honeycomb shape to form a honeycomb catalyst.

In general, a formed catalyst containing a transition-metal-containing zeolite according to the present invention is formed by mixing a transition-metal-containing zeolite with an inorganic binder, such as silica or alumina, or inorganic fiber, such as alumina fiber or glass fiber, shaping the mixture by an extrusion method or a compression method, and calcinating the mixture to yield the formed catalyst. Preferably, the mixture can be formed into a honeycomb shape to yield a honeycomb catalyst.

A catalyst containing a transition-metal-containing zeolite according to the present invention is effective as an automobile exhaust-gas purification catalyst for removing nitrogen oxides by contact with an exhaust gas containing nitrogen oxides. The exhaust gas may contain components other than nitrogen oxides, such as hydrocarbons, carbon monoxide, carbon dioxide, hydrogen, nitrogen, oxygen, sulfur oxides, and/or water. A known reducing agent, for example, a nitrogen-containing compound, such as a hydrocarbon, ammonia, or urea, may be used.

An exhaust gas treatment catalyst according to the present invention can remove nitrogen oxides contained in a wide variety of exhaust gases emitted from diesel cars, gasoline cars, and various diesel engines, boilers, and gas turbines for use in stationary power generation, ships, agricultural machinery, construction equipment, two-wheeled vehicles, and aircrafts, for example.

Although the contact conditions for a catalyst containing a transition-metal-containing zeolite according to the present invention and an exhaust gas are not particularly limited, the space velocity of the exhaust gas is generally 100/h or more, preferably 1000/h or more, and generally 500000/h or less, preferably 100000/h or less, and the temperature is generally 100° C. or higher, preferably 150° C. or higher, and generally 700° C. or lower, preferably 500° C. or lower.

<Water Vapor Adsorbent>

A transition-metal-containing zeolite according to the present invention has excellent water vapor adsorption and desorption characteristics.

The adsorption and desorption characteristics can vary with conditions. In general, a transition-metal-containing zeolite according to the present invention can adsorb water vapor from low temperature to high temperature at which it is commonly difficult to adsorb water vapor and from high humidity to low humidity at which it is commonly difficult to adsorb water vapor, and can desorb water vapor at a relatively low temperature of 100° C. or less.

Such a water vapor adsorbent may be used in adsorption heat pumps, heat exchangers, and desiccant air conditioners.

A transition-metal-containing zeolite according to the present invention has excellent performance particularly as a water vapor adsorbent. A transition-metal-containing zeolite according to the present invention used as a water vapor adsorbent may be used in combination with a metal oxide, such as silica, alumina, or titania, a binder component, such as clay, or a thermal-conductive component. When a transition-metal-containing zeolite according to the present invention is used in combination with such a component, the transition-metal-containing zeolite content of a water vapor adsorbent is preferably 60% by weight or more, more preferably 70% by weight or more, still more preferably 80% by weight or more.

EXAMPLES

Although the present invention is more specifically described in the following examples, the present invention is not limited to these examples without departing from the gist of the present invention.

The analysis and performance evaluation of a transition-metal-containing zeolite obtained in the following examples and comparative examples (hereinafter referred to simply as a "zeolite") were performed by the following methods.

[XRD Measurement]

An XRD was measured using a sample prepared by the following method under the following conditions.

<Sample Preparation>

Approximately 100 mg of a zeolite sample manually pulverized with an agate mortar was weighed using a sample holder of a certain shape such that each sample had the same weight.

<Measurement Conditions>

X-ray source: Cu-Kα
Output setting: 40 kV, 30 mA
Optical conditions for measurement:
Divergence slit=1 degree
Scattering slit=1 degree
Light-receiving slit=0.2 mm
Diffraction peak position: 2θ (diffraction angle)
Measurement range: 2θ=3 to 50 degrees
Scan speed: 3.0 degrees (2θ/s), continuous scanning

[Analysis of Cu Content and Zeolite Composition]

In an elementary analysis of silicon, aluminum, and phosphorus atoms and a transition metal copper atom of a zeolite framework structure, a sample was dissolved in aqueous hydrochloric acid by the application of heat and was subjected to inductively coupled plasma (ICP) spectroscopy to determine the amount $W_1$ (% by weight) of the silicon, aluminum, and phosphorus atoms and Cu of the zeolite framework structure. Alternatively, a sample was formed into a tablet, which was then subjected to X-ray fluorescence analysis (XRF) to determine the amount $W_1$ (% by weight) of the silicon, aluminum, and phosphorus atoms and Cu of the zeolite framework structure.

The water content $W_{H2O}$ (% by weight) of the sample was measured by thermogravimetric analysis (TG). The amount W (% by weight) of atoms and Cu of the framework structure of the transition-metal-containing zeolite in an anhydrous state was calculated using the following equation (V).

$$W = W_1/(1-W_{H2O}) \quad (V)$$

[Measurement of BET Specific Surface Area]

A BET specific surface area was measured by a flow single-point method using a fully-automatic powder specific surface area measuring apparatus (AMS1000) manufactured by Okura Riken Co. Ltd.

[Measurement of Water Vapor Adsorption Isotherm]

After the prepared zeolite sample was degassed at 120° C. for 5 hours, a water vapor adsorption isotherm at 25° C. was measured with a vapor adsorption measuring apparatus (Belsorp 18, manufactured by BEL Japan, Inc.) under the following conditions.

Air thermostat temperature: 50° C.
Adsorption temperature: 25° C.
Initial introduction pressure: 3.0 torr
Number of introduction pressure set points: 0
Saturated vapor pressure: 23.755 torr
Equilibrium time: 500 seconds

[Evaluation of Catalytic Activity]

The prepared zeolite sample was press-formed, was crushed, and was passed through a sieve to adjust the particle size in the range of 0.6 to 1 mm. After sizing, 1 ml of the zeolite sample was charged into a normal-pressure fixed-bed flow reactor. The zeolite layer was heated while a gas having a composition shown in Table 1 was passed through the zeolite layer at a space velocity SV=100000/h. When the outlet NO concentration was constant at temperatures of 150° C., 175° C., and 200° C. or at temperatures of 150° C., 175° C., 200° C., 300° C., 400° C., and 500° C., the nitrogen oxide removal activity of the zeolite sample was evaluated as the following NO removal efficiency.

NO removal efficiency (%)={(inlet NO concentration)−(outlet NO concentration)}/(inlet NO concentration)×100

TABLE 1

| Gas Components | Concentration |
|---|---|
| NO | 350 ppm |
| $NH_3$ | 385 ppm |
| $O_2$ | 15% by volume |
| $H_2O$ | 5% by volume |
| $N_2$ | Remainder |

[Hydrothermal Durability Test]

10% by volume water vapor was passed through the prepared zeolite sample at 800° C. at a space velocity SV=3000/h for 5 hours as hydrothermal treatment. After the hydrothermal treatment, the zeolite sample collected was press-formed, was crushed, and was passed through a sieve to adjust the particle size in the range of 0.6 to 1 mm. After sizing, the NO removal efficiency of the zeolite sample was evaluated by the method for evaluating catalytic activity described above.

[Water Vapor Adsorption and Desorption Cycle Durability Test-1 (90° C.-80° C.-5° C. Water Vapor Adsorption and Desorption Cycle Test)]

0.5 g of the prepared zeolite sample was placed in a disk-shaped vacuum vessel held at 90° C. and was repeatedly exposed to a 5° C. saturated water vapor atmosphere and an 80° C. saturated water vapor atmosphere for 90 seconds each. Part of water adsorbed on the sample during exposure to the 80° C. saturated water vapor atmosphere is desorbed during exposure to the 5° C. saturated water vapor atmosphere and moves into a water tank held at 5° C. The average adsorption per cycle ($Cn;m$ (g/g)) was calculated as described below from the total amount of water ($Qn;m$ (g)) that moved into the 5° C. water tank from m-th adsorption to n-th desorption and the dry weight of the sample (W (g)).

$$[Cn;m]=[Qn;m]/(n-m+1)/W$$

In the water vapor adsorption and desorption cycle durability test, the ratio (percentage) of the average adsorption between the 1001th cycle and the 2000th cycle to the average adsorption between the first cycle and the 1000th was calculated as a retention ratio in the adsorption and desorption test (hereinafter referred to as "90-80-5 durability").

[Water Vapor Adsorption and Desorption Cycle Durability Test-2 (90° C.-60° C.-5° C. Water Vapor Adsorption and Desorption Cycle Test)]

A catalyst was subjected to a "90° C.-60° C.-5° C. water vapor adsorption and desorption cycle durability test" (hereinafter referred to as a "90-60-5 durability") in a test apparatus illustrated in FIG. 10 under adsorption and desorption cycle test conditions that are close to practical conditions.

Figure 10:
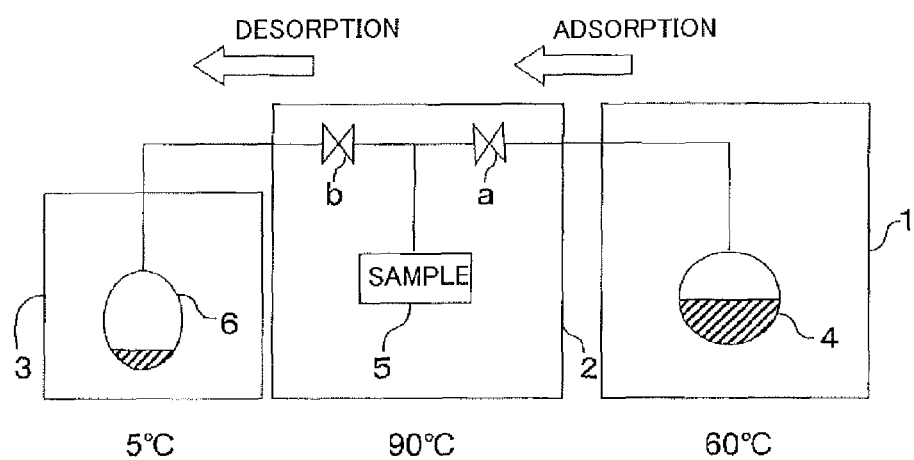
FIG. 10 is a schematic view of a test apparatus used in a water vapor adsorption and desorption cycle durability test-2 (90° C.-60° C.-5° C.) in examples.

In FIG. 10, 1 denotes a thermostatic chamber held at 60° C., 2 denotes a thermostatic chamber held at 90° C., and 3 denotes a thermostatic chamber held at 5° C. The thermostatic chamber 1 includes a container 4 for saturated water vapor. The thermostatic chamber 2 includes a vacuum vessel 5 that includes a sample. The thermostatic chamber 3 includes a container 6 serving as a water tank. The container 4 is connected to the vacuum vessel 5 through a pipe having a valve a. The container 6 is connected to the vacuum vessel 5 through a pipe having a valve 6.

The sample is placed in the vacuum vessel 5 held at 90° C. and is repeatedly exposed to a 5° C. saturated water vapor atmosphere (relative humidity at 90° C. is 1%) and a 60° C. saturated water vapor atmosphere (relative humidity at 90° C. is 28%) for 90 seconds each. During exposure to the 60° C. saturated water vapor atmosphere, the valve a is opened (the valve b remains closed) in FIG. 10. After this state is maintained for 90 seconds, the valve a is closed, and simultaneously the valve b is opened. Part of water adsorbed on the sample 1 during exposure to the 60° C. saturated water vapor atmosphere is desorbed during exposure to the 5° C. saturated water vapor atmosphere and moves into the container 6 serving as a water tank held at 5° C. This state is maintained for 90 seconds.

The adsorption and desorption cycle is repeatedly performed 2000 times.

After the test, the NO removal efficiency of the sample collected was evaluated under the conditions of the method for evaluating catalytic activity described above.

Exhaust gases emitted from diesel engines of vehicles contain water, which constitutes 5% to 15% by volume of the exhaust gases. While a vehicle is moving, the exhaust gas has a high temperature of 200° C. or more, and the relative humidity decreases to 5% or less. Thus, the catalyst desorbs water. When the vehicle is stationary, since the relative humidity is 15% or more at approximately 90° C., the catalyst adsorbs water. Under the present conditions, the relative humidity is 28% during adsorption at 90° C. Cycle durability under the conditions close to practical conditions is important in actual operation.

[Measurement with Electron Probe Microanalyzer (EMPA)]

The prepared zeolite sample was embedded in a resin, was cut with a cross-section microtome (diamond blade), was coated with Au by vapor deposition, and was analyzed under the following conditions.

Apparatus: JEOL shaseiJXA-8100

Electron gun: W emitter, accelerating voltage 15 kV, irradiation current 20 nA

Element mapping: corresponding to visual field of 3000 or 4000 times analyzed area Acquisition time: 100 ms/point Target elements (analyzing crystals): Si (PET), Cu (LIFH)

[Coefficient of Variation]

Zeolite particles are extracted from a Si intensity map of a sample of an aluminophosphate zeolite containing 3% by weight or more transition metal M observed with an electron probe microanalyzer (EPMA) in three visual fields. ImageProPlus (available from Media Cybernetics, Inc.) was used for image processing.

After the Si map obtained by the EPMA analysis was subjected to a median filter using the processing software to reduce noise, a high-intensity portion was extracted as a sample particle. The mean value and the standard deviation of the CuKα intensity of the interior of the extracted sample particle were calculated to determine a coefficient of variation. The image processing can eliminate isolated copper not dispersed in the zeolite so as to examine the distribution of copper dispersed in the zeolite. For example, when a particle in a Cu intensity map is not present in a Si intensity map in the same visual field, the particle is eliminated as isolated copper.

Example 1

8.1 g of 85% by weight phosphoric acid and 5.4 g of pseudo-boehmite (containing 25% by weight water, manufactured by Condea) were gradually added to 10 g of water and were stirred for one hour. 0.6 g of fumed silica (Aerosil 200, manufactured by Nippon Aerosil Co., Ltd.) and 10 g of water were added to the mixture and were stirred for one hour. 3.4 g of morpholine and 4.0 g of triethylamine were then gradually added to the mixture and were stirred for one hour. The mixture is hereinafter referred to as a liquid A.

In addition to the liquid A, a liquid B was prepared by dissolving 1.0 g of $CuSO_4.5H_2O$ (manufactured by Kishida Chemical Co., Ltd.) in 13.4 g of water and adding 0.8 g of tetraethylenepentamine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
$SiO_2$: 0.25
$Al_2O_3$: 1
$P_2O_5$: 0.875
CuO: 0.1
Tetraethylenepentamine: 1
Morpholine: 1
Triethylamine: 1
Water: 50

The aqueous gel thus prepared was charged into a 100 ml stainless steel autoclave having a fluoropolymer inner tube and was allowed to react at 190° C. for 24 hours while stirring at 15 rpm. After hydrothermal synthesis and cooling, supernatant was removed by decantation to collect a precipitate. The precipitate was washed with water three times, was filtered off, and was dried at 100° C. The precipitate was calcinated at 550° C. in the airflow to remove organic substances, thereby yielding a zeolite 1.

XRD measurement showed that the zeolite 1 had a CHA structure (framework density=14.6 T/1,000 cubic angstroms). SEM measurement showed that the average particle size was 10 μm.

FIG. 1 shows the XRD measurement of the zeolite 1.

The catalytic activity of the zeolite 1 was evaluated before and after the hydrothermal durability test. Table 2 shows the results.

Example 2

The liquid A was prepared in the same manner as in Example 1.

In addition to the liquid A, a liquid B was prepared by dissolving 1.0 g of $CuSO_4.5H_2O$ (manufactured by Kishida Chemical Co., Ltd.) in 13.4 g of water and adding 0.6 g of triethylenetetramine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
$SiO_2$: 0.25
$Al_2O_3$: 1
$P_2O_5$: 0.875
CuO: 0.1
Triethylenetetramine: 1
Morpholine: 1
Triethylamine: 1
Water: 50

The aqueous gel was subjected to hydrothermal synthesis, separation of the product, drying, and calcinating in the same manner as in Example 1, thereby yielding a zeolite 2.

XRD measurement showed that the zeolite 2 had the CHA structure as is the case with the zeolite 1 according to Example 1. SEM measurement showed that the average particle size was 12 μm.

Figure 19:
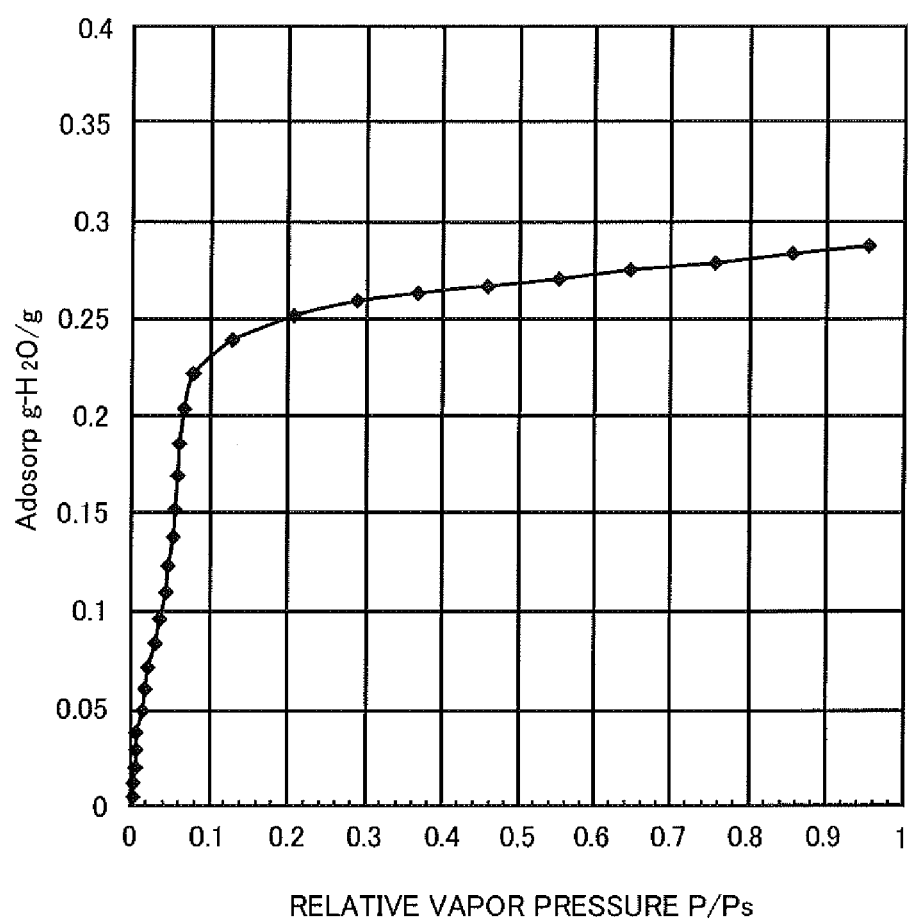
FIG. 19 is a graph of water vapor adsorption isotherm of the zeolite 2 produced in Example 2.

FIG. 19 shows the water vapor adsorption isotherm of the zeolite 2.

The catalytic activity of the zeolite 2 was evaluated before and after the hydrothermal durability test. Table 2 shows the results.

The water vapor adsorption and desorption cycle durability test-1 (90-80-5 durability) of the zeolite 2 showed that the retention ratio in the adsorption and desorption test was 100%.

Example 3

6.5 g of 85% by weight phosphoric acid and 5.4 g of pseudo-boehmite (containing 25% by weight water, manufactured by Condea) were gradually added to 10 g of water and were stirred for one hour. 1.4 g of fumed silica (Aerosil 200, manufactured by Nippon Aerosil Co., Ltd.) and 10 g of water were added to the mixture and were stirred for one hour. 3.4 g of morpholine and 4.0 g of triethylamine were then gradually added to the mixture and were stirred for one hour. The mixture is hereinafter referred to as a liquid A.

In addition to the liquid A, a liquid B was prepared by dissolving 1.0 g of $CuSO_4.5H_2O$ (manufactured by Kishida Chemical Co., Ltd.) in 13.7 g of water and adding 0.6 g of triethylenetetramine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
$SiO_2$: 0.6
$Al_2O_3$: 1
$P_2O_5$: 0.7
CuO: 0.1
Triethylenetetramine: 0.1
Morpholine: 1
Triethylamine: 1
Water: 50

The aqueous gel was subjected to hydrothermal synthesis, separation of the product, drying, and calcinating in the same manner as in Example 1, thereby yielding a zeolite 3.

XRD measurement showed that the zeolite 3 had the CHA structure as is the case with the zeolite 1 according to Example 1.

The catalytic activity of the zeolite 3 was evaluated before and after the hydrothermal durability test. Table 2 shows the results.

Example 4

The liquid A was prepared in the same manner as in Example 1.

In addition to the liquid A, a liquid B was prepared by dissolving 0.8 g of $Cu(CH_3COO)_2.5H_2O$ (manufactured by Kishida Chemical Co., Ltd.) in 13.4 g of water and adding 0.6 g of triethylenetetramine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
$SiO_2$: 0.25
$Al_2O_3$: 1

P$_2$O$_5$: 0.875
CuO: 0.1
Triethylenetetramine: 0.1
Morpholine: 1
Triethylamine: 1
Water: 50

The aqueous gel was subjected to hydrothermal synthesis, separation of the product, drying, and calcinating in the same manner as in Example 1, thereby yielding a zeolite 4.

Figure 3:
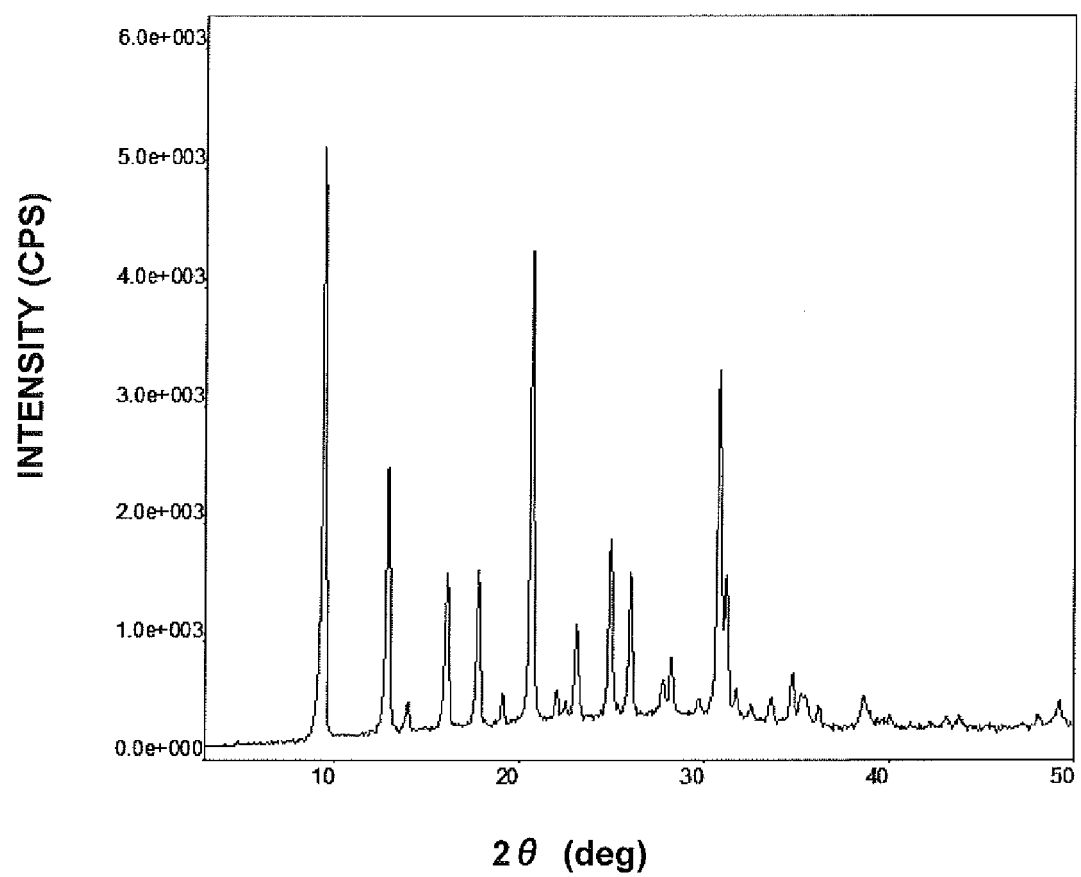
FIG. 3 is a chart of an XRD measurement for the zeolite 4 produced in Example 4.

XRD measurement showed that the zeolite 4 had a CHA structure (framework density=14.6 T/1,000 cubic angstroms). FIG. 3 shows the XRD measurement of the zeolite 4.

The Cu content (W$_1$) of the zeolite 4 was 3.6% by weight as determined by an XRF analysis. An XRF composition analysis of the zeolite showed that the ratios (molar ratios) of a silicon atom, an aluminum atom, and a phosphorus atom of the framework structure to the total of the silicon atom, the aluminum atom, and the phosphorus atom were 0.09 for the silicon atom, 0.50 for the aluminum atom, and 0.41 for the phosphorus atom.

Figure 4:
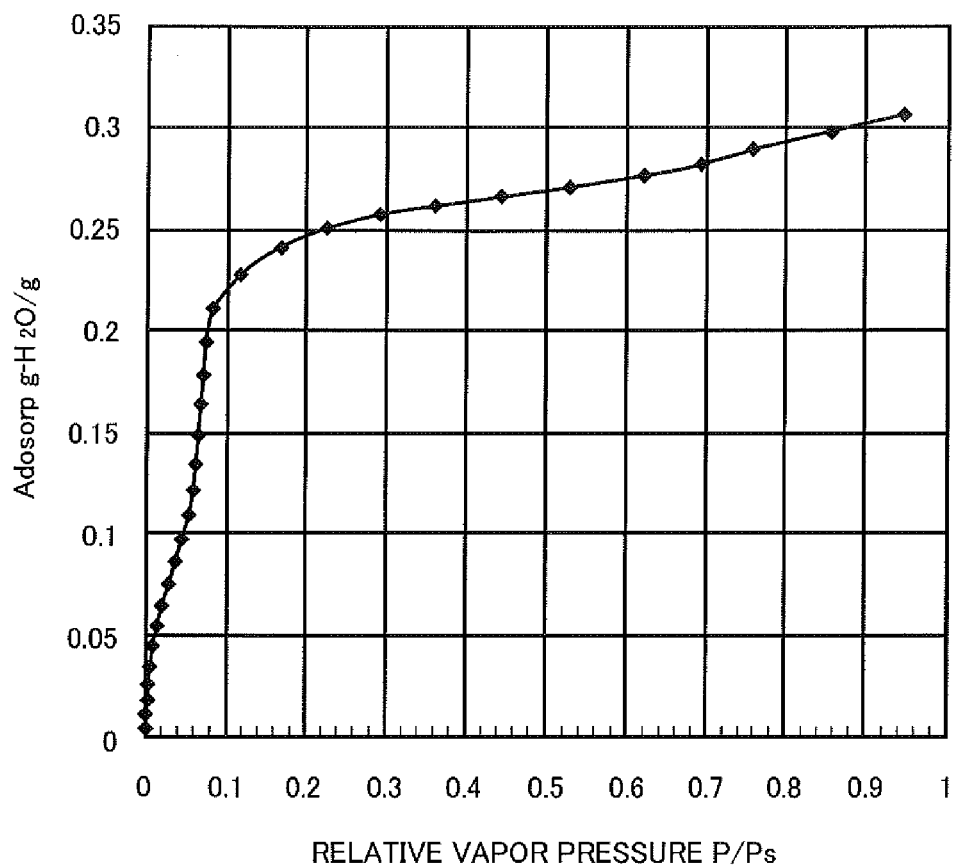
FIG. 4 is a graph of water vapor adsorption isotherm of the zeolite 4 produced in Example 4.

Measurement of a water vapor adsorption isotherm of the zeolite 4 at 25° C. showed that the amount of adsorption at a relative vapor pressure of 0.01 was 1.93 mol/mol-Si, and the amount of adsorption at a relative vapor pressure of 0.7 was 283 mg/g. FIG. 4 shows a water vapor adsorption isotherm of the zeolite 4.

The catalytic activity of the zeolite 4 was evaluated. Tables 2 and 3 show the results.

Example 5

8.1 g of 85% by weight phosphoric acid and 5.4 g of pseudo-boehmite (containing 25% by weight water, manufactured by Condea) were gradually added to 10 g of water and were stirred for one hour. 0.6 g of fumed silica (Aerosil 200, manufactured by Nippon Aerosil Co., Ltd.) and 10 g of water were added to the mixture and were stirred for one hour. The mixture is hereinafter referred to as a liquid A.

In addition to the liquid A, a liquid B was prepared by dissolving 1.0 g of CuSO$_4$.5H$_2$O (manufactured by Kishida Chemical Co., Ltd.) in 13.4 g of water and adding 7.6 g of tetraethylenepentamine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
SiO$_2$: 0.25
Al$_2$O$_3$: 1
P$_2$O$_5$: 0.875
CuO: 0.1
Tetraethylenepentamine: 1
Water: 50

The aqueous gel was subjected to hydrothermal synthesis, separation of the product, drying, and calcinating in the same manner as in Example 1, thereby yielding a zeolite 5.

XRD measurement showed that the zeolite 5 had the CHA structure as is the case with the zeolite 1 according to Example 1. SEM measurement showed that the average particle size was 12 μm.

The catalytic activity of the zeolite 5 was evaluated before the hydrothermal durability test (initial activity). Table 2 shows the results.

Table 2 shows the Cu contents W$_1$ (hydrous state) and W (anhydrous state) of each of the zeolites 1 to 5 according to Examples 1 to 5.

TABLE 2

| | Cu content W$_1$ (wt %) | Cu content W (wt %) | | NO removal efficiency (%) | | | | | |
|---|---|---|---|---|---|---|---|---|---|
| | | | | 150° C. | 175° C. | 200° C. | 300° C. | 400° C. | 500° C. |
| Example 1 (Zeolite 1) | 3.0 | 3.8 | Initial activity | 56 | 90 | 97 | 100 | 86 | 74 |
| | | | After hydrothermal durability test | 51 | 86 | 96 | 99 | 88 | 72 |
| Example 2 (Zeolite 2) | 3.4 | 4.3 | Initial activity | 49 | 83 | 93 | 99 | 90 | 78 |
| | | | After hydrothermal durability test | 65 | 93 | 99 | 100 | 83 | 73 |
| Example 3 (Zeolite 3) | 2.6 | 3.3 | Initial activity | 44 | 83 | 95 | 99 | 97 | 87 |
| | | | After hydrothermal durability test | 44 | 82 | 94 | 99 | 93 | 90 |
| Example 4 (Zeolite 4) | 3.6 | 4.5 | Initial activity | 47 | 84 | 95 | 99 | 91 | 78 |
| | | | After hydrothermal durability test | 56 | 88 | 96 | 99 | 89 | 79 |
| Example 5 (Zeolite 5) | 4.1 | 5.1 | Initial activity | 59 | 91 | 98 | 100 | 96 | 78 |

Example 6

The liquid A was prepared in the same manner as in Example 1.

In addition to the liquid A, a liquid B was prepared by dissolving 0.3 g of CuSO$_4$.5H$_2$O (manufactured by Kishida Chemical Co., Ltd.) in 13.4 g of water and adding 0.6 g of triethylenetetramine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
SiO$_2$: 0.25
Al$_2$O$_3$: 1
P$_2$O$_5$: 0.875
CuO: 0.03
Triethylenetetramine: 0.1
Morpholine: 1
Triethylamine: 1
Water: 50

The aqueous gel was subjected to hydrothermal synthesis, separation of the product, drying, and calcinating in the same manner as in Example 1, thereby yielding a zeolite 6.

XRD measurement showed that the zeolite 6 had the CHA structure as is the case with the zeolite 1 according to Example 1.

Figure 2:
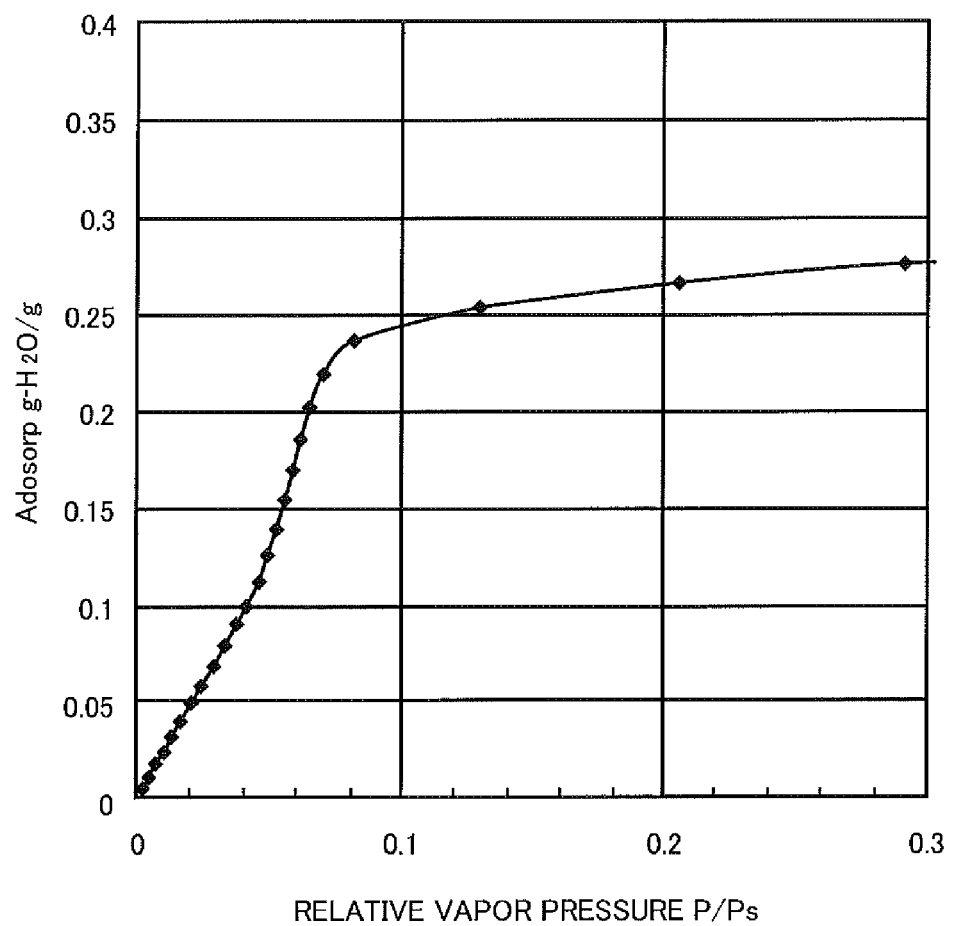
FIG. 2 is a graph of water vapor adsorption isotherm of the zeolite 6 produced in Example 6.

Measurement of a water vapor adsorption isotherm of the zeolite 6 at 25° C. showed that a change in the amount of adsorption from a relative vapor pressure of 0.04 to 0.09 was 0.15 g-$H_2O$/g. Measurement of a water vapor adsorption isotherm at 25° C. showed that the amount of water adsorption at a relative vapor pressure of 0.2 was 0.26 g-$H_2O$/g. FIG. 2 shows a water vapor adsorption isotherm of the zeolite 6.

Example 7

The liquid A was prepared in the same manner as in Example 1.

In addition to the liquid A, a liquid B was prepared by dissolving 1.1 g of $FeSO_4 \cdot 7H_2O$ (manufactured by Kishida Chemical Co., Ltd.) in 13.4 g of water and adding 2.4 g of tetraethylenepentamine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
  $SiO_2$: 0.25
  $Al_2O_3$: 1
  $P_2O_5$: 0.875
  FeO: 0.1
  Tetraethylenepentamine: 0.3
  Morpholine: 1
  Triethylamine: 1
  Water: 50

The aqueous gel was subjected to hydrothermal synthesis, separation of the product, drying, and calcinating in the same manner as in Example 1, thereby yielding a zeolite 7.

XRD measurement showed that the zeolite 7 had the CHA structure as is the case with the zeolite 1 according to Example 1.

Example 8

The liquid A was prepared in the same manner as in Example 1.

In addition to the liquid A, a liquid B was prepared by dissolving 1.1 g of $FeSO_4 \cdot 7H_2O$ (manufactured by Kishida Chemical Co., Ltd.) in 13.4 g of water and adding 7.7 g of tetraethylenepentamine (manufactured by Kishida Chemical Co., Ltd.) to the solution.

The liquid B was gradually added to the liquid A. The mixture was stirred for one hour to yield an aqueous gel having the following composition.

<Aqueous Gel Composition (Molar Ratio)>
  $SiO_2$: 0.25
  $Al_2O_3$: 1
  $P_2O_5$: 0.875
  FeO: 0.1
  Tetraethylenepentamine: 1
  Morpholine: 1
  Triethylamine: 1
  Water: 50

The aqueous gel was subjected to hydrothermal synthesis, separation of the product, drying, and calcinating in the same manner as in Example 1, thereby yielding a zeolite 8.

XRD measurement showed that the zeolite 8 had the CHA structure as is the case with the zeolite 1 according to Example 1.

These results show that a transition-metal-containing zeolite can be easily and efficiently produced by the method for producing a transition-metal-containing zeolite according to the first invention, and the transition-metal-containing zeolite has high catalytic activity, excellent water vapor adsorption and desorption performance, and excellent high-temperature hydrothermal durability.

Example 9

8.1 g of 85% by weight phosphoric acid and 0.5 g of copper (II) oxide were added to 20 g of water and were stirred until copper (II) oxide was completely dissolved. 5.4 g of pseudo-boehmite (containing 25% by weight water, manufactured by Condea) was then gradually added to the solution. The solution was stirred for one hour. 0.6 g of fumed silica (Aerosil 200, manufactured by Nippon Aerosil Co., Ltd.) and 13.4 g of water were added to the solution and were stirred for one hour. 3.4 g of morpholine and 4.0 g of triethylamine were then gradually added to the solution and were stirred for one hour. 1.1 g of tetraethylenepentamine (manufactured by Kishida Chemical Co., Ltd.) was added to the solution and was stirred for one hour to yield an aqueous gel having the following composition.

<Aqueous Gel Composition (Molar Ratio)>
  $SiO_2$: 0.25
  $Al_2O_3$: 1
  $P_2O_5$: 0.875
  CuO: 0.15
  Tetraethylenepentamine: 0.15
  Morpholine: 1
  Triethylamine: 1
  Water: 50

The aqueous gel thus prepared was charged into a 100-ml stainless steel autoclave having a fluoropolymer inner tube and was allowed to react at 190° C. for 24 hours while stirring at 15 rpm. After hydrothermal synthesis and cooling, supernatant and a copper powder were removed by decantation to collect a precipitate. The precipitate was washed with water three times, was filtered off, and was dried at 100° C. The precipitate was calcinated at 550° C. in the airflow to remove organic substances, thereby yielding a zeolite 9.

Figure 11:
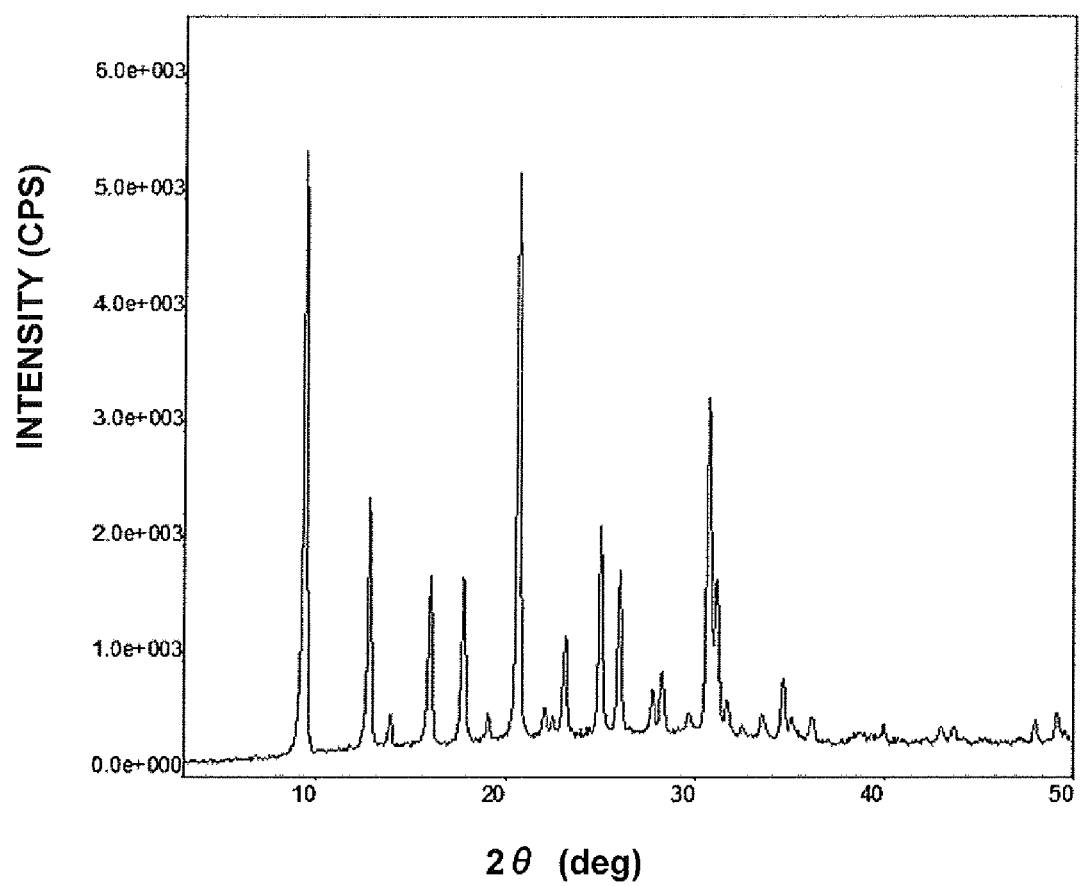
FIG. 11 is a chart of an XRD measurement for the zeolite 9 produced in Example 9.

XRD measurement showed that the zeolite 9 had a CHA structure (framework density=14.6 T/1,000 cubic angstroms). FIG. 11 shows the XRD measurement of the zeolite 9. The zeolite 9 had an average primary particle size of 13 μm.

The zeolite 9 had a Cu content (W) of 4.3% by weight as determined by an XRF analysis. An XRF composition analysis of the zeolite showed that the ratios (molar ratios) of a silicon atom, an aluminum atom, and a phosphorus atom of the framework structure to the total of the silicon atom, the aluminum atom, and the phosphorus atom were 0.097 for the silicon atom, 0.49 for the aluminum atom, and 0.41 for the phosphorus atom.

Figure 12:
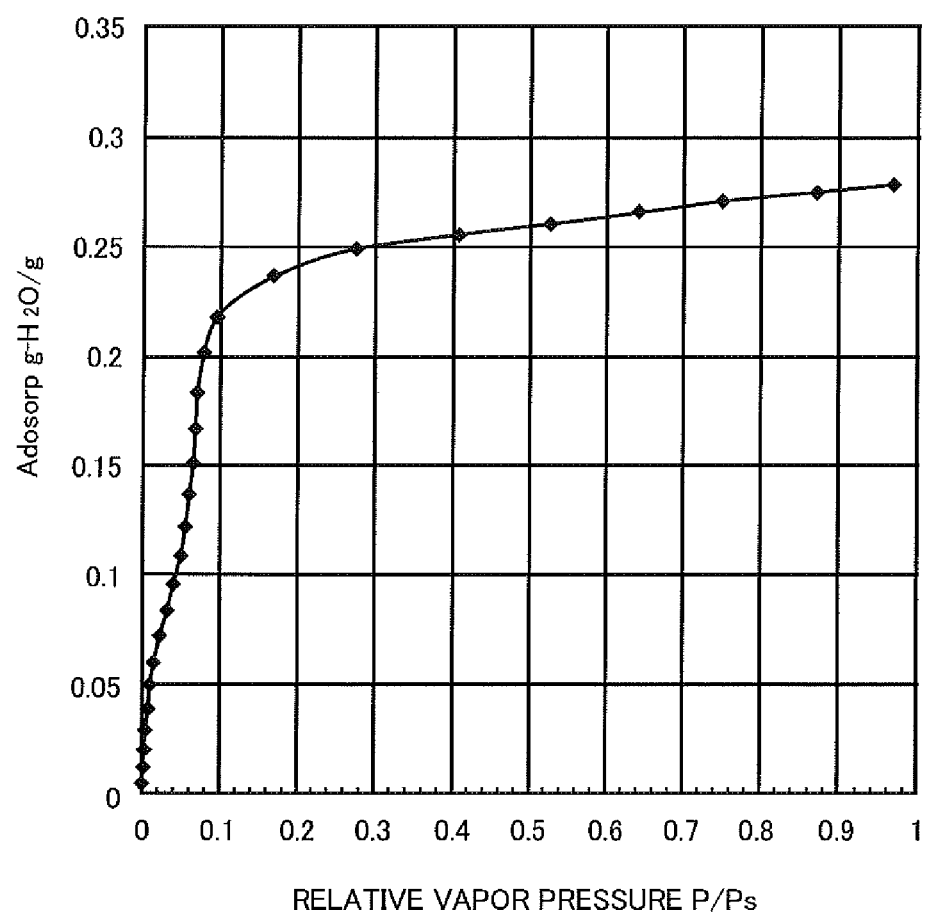
FIG. 12 is a graph of water vapor adsorption isotherm of the zeolite 9 produced in Example 9.

Measurement of a water vapor adsorption isotherm of the zeolite 9 at 25° C. showed that the amount of adsorption at a relative vapor pressure of 0.01 was 3.52 mol/mol-Si, and the amount of adsorption at a relative vapor pressure of 0.7 was 267 mg/g. FIG. 12 shows a water vapor adsorption isotherm of the zeolite 9.

The catalytic activity of the zeolite 9 was evaluated. Table 3 shows the results.

Figure 13:
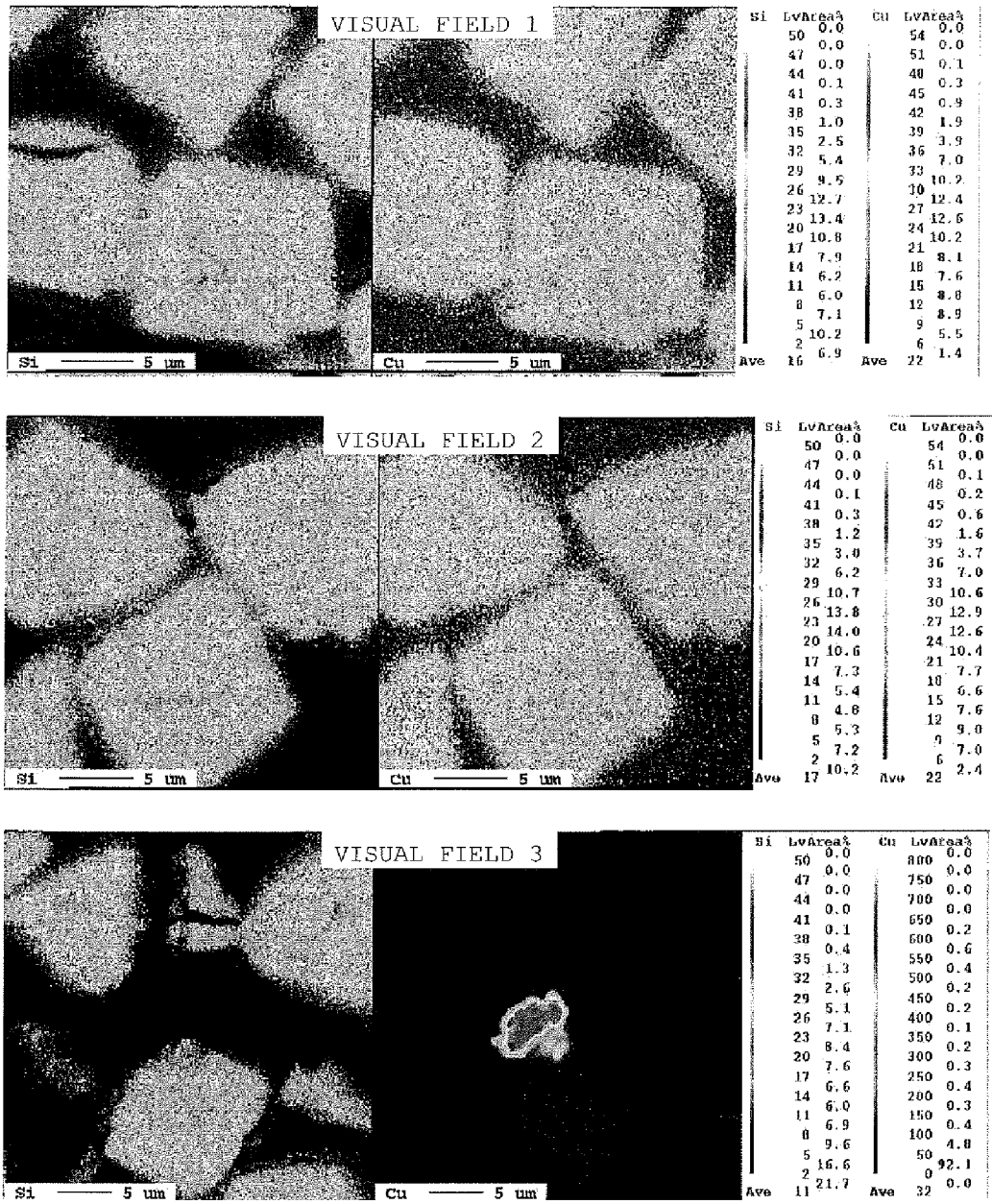
FIG. 13 is Si and Cu element maps of the zeolite 9 produced in Example 9 measured with EPMA.

FIG. 13 shows EPMA measurements (Si and Cu element maps). In the zeolite 9, a Cu particle at the center of the Cu intensity map in a visual field 3 was not present in the Si intensity map and was therefore eliminated as isolated copper. The average coefficient of variation of Cu intensity was 27.9%.

The catalytic activity and the BET specific surface area of the zeolite 9 were measured. Table 4 shows the results.

Example 10

A zeolite 10 was produced by hydrothermal synthesis performed in the same manner as in Example 9 and calcinating at 800° C. in the airflow to remove organic substances.

XRD measurement showed that the zeolite 10 had a CHA structure (framework density=14.6 T/1,000 cubic angstroms). The Cu loading (W) was 4.3% by weight as determined by an XRF analysis. An XRF composition analysis of the zeolite showed that the ratios (molar ratios) of a silicon atom, an aluminum atom, and a phosphorus atom of the framework structure to the total of the silicon atom, the aluminum atom, and the phosphorus atom were 0.097 for the silicon atom, 0.49 for the aluminum atom, and 0.41 for the phosphorus atom.

Measurement of a water vapor adsorption isotherm of the zeolite 10 at 25° C. showed that the amount of adsorption at a relative vapor pressure of 0.01 was 3.52 mol/mol-Si, and the amount of adsorption at a relative vapor pressure of 0.7 was 267 mg/g.

Example 11

95 g of 75% by weight phosphoric acid and 7.2 g of copper (II) oxide were added to 217 g of water and were stirred until copper (II) oxide was completely dissolved. 61.8 g of pseudo-boehmite (containing 25% by weight water, manufactured by Condea) was then gradually added to the solution. The solution was stirred for two hours. 16.4 g of fumed silica (Aerosil 200, manufactured by Nippon Aerosil Co., Ltd.) and 153.2 g of water were added to the solution and were stirred for 10 minutes. 39.6 g of morpholine and 46 g of triethylamine were then gradually added to the solution and were stirred for one hour. 17.2 g of tetraethylenepentamine (manufactured by Kishida Chemical Co., Ltd.) was added to the solution and was stirred for 0.5 hours to yield an aqueous gel having the following composition.
<Aqueous Gel Composition (Molar Ratio)>
$SiO_2$: 0.6
$Al_2O_3$: 1
$P_2O_5$: 0.8
CuO: 0.2
Tetraethylenepentamine: 0.2
Morpholine: 1
Triethylamine: 1
Water: 50

The aqueous gel thus prepared was charged into a 1-L stainless steel autoclave having a fluoropolymer inner tube and was allowed to react at 190° C. for 24 hours while stirring at 200 rpm. After hydrothermal synthesis, cooling, and filtering, the resulting product was washed with ion-exchanged water and was dried at 100° C. The product was calcinated at 550° C. in the airflow to remove organic substances, thereby yielding a zeolite 11.

XRD measurement showed that the zeolite 11 had a CHA structure (framework density=14.6 T/1,000 cubic angstroms). The Cu content (W) was 5.1% by weight as determined by an XRF analysis. An XRF composition analysis of the zeolite showed that the ratios (molar ratios) of a silicon atom, an aluminum atom, and a phosphorus atom of the framework structure to the total of the silicon atom, the aluminum atom, and the phosphorus atom were 0.16 for the silicon atom, 0.50 for the aluminum atom, and 0.34 for the phosphorus atom. The zeolite 11 had an average primary particle size of 13 μm.

Figure 5:
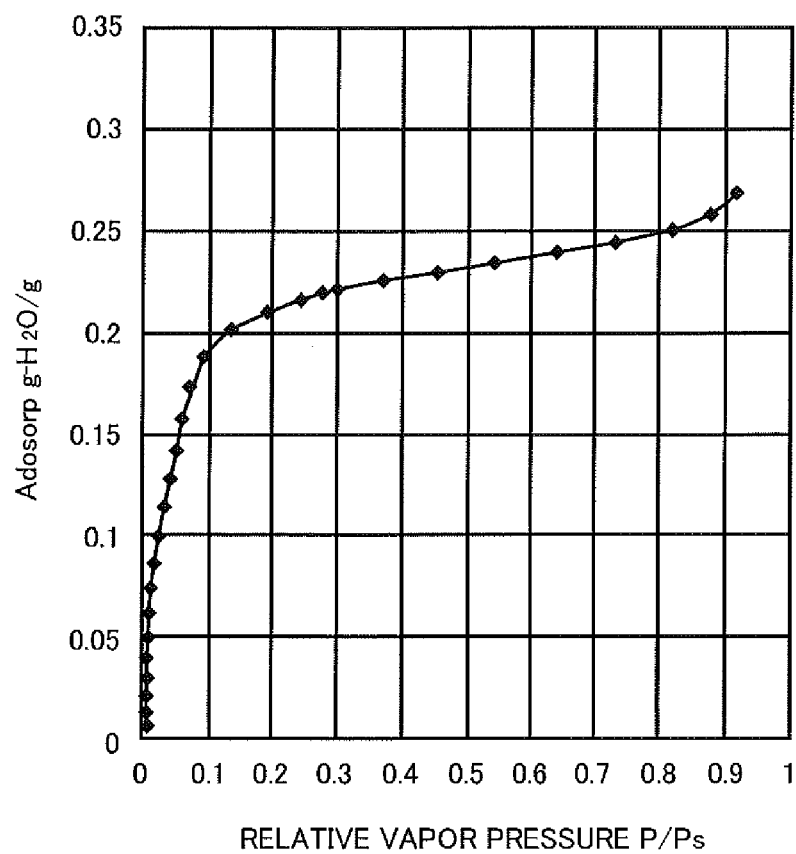
FIG. 5 is a graph of water vapor adsorption isotherm of the zeolite 11 produced in Example 11.

Measurement of a water vapor adsorption isotherm of the zeolite 11 at 25° C. showed that the amount of adsorption at a relative vapor pressure of 0.01 was 1.68 mol/mol-Si, and the amount of adsorption at a relative vapor pressure of 0.7 was 275 mg/g. FIG. 5 shows a water vapor adsorption isotherm of the zeolite 11.

The catalytic activity of the zeolite 11 was evaluated. Table 3 shows the results.

Figure 14:
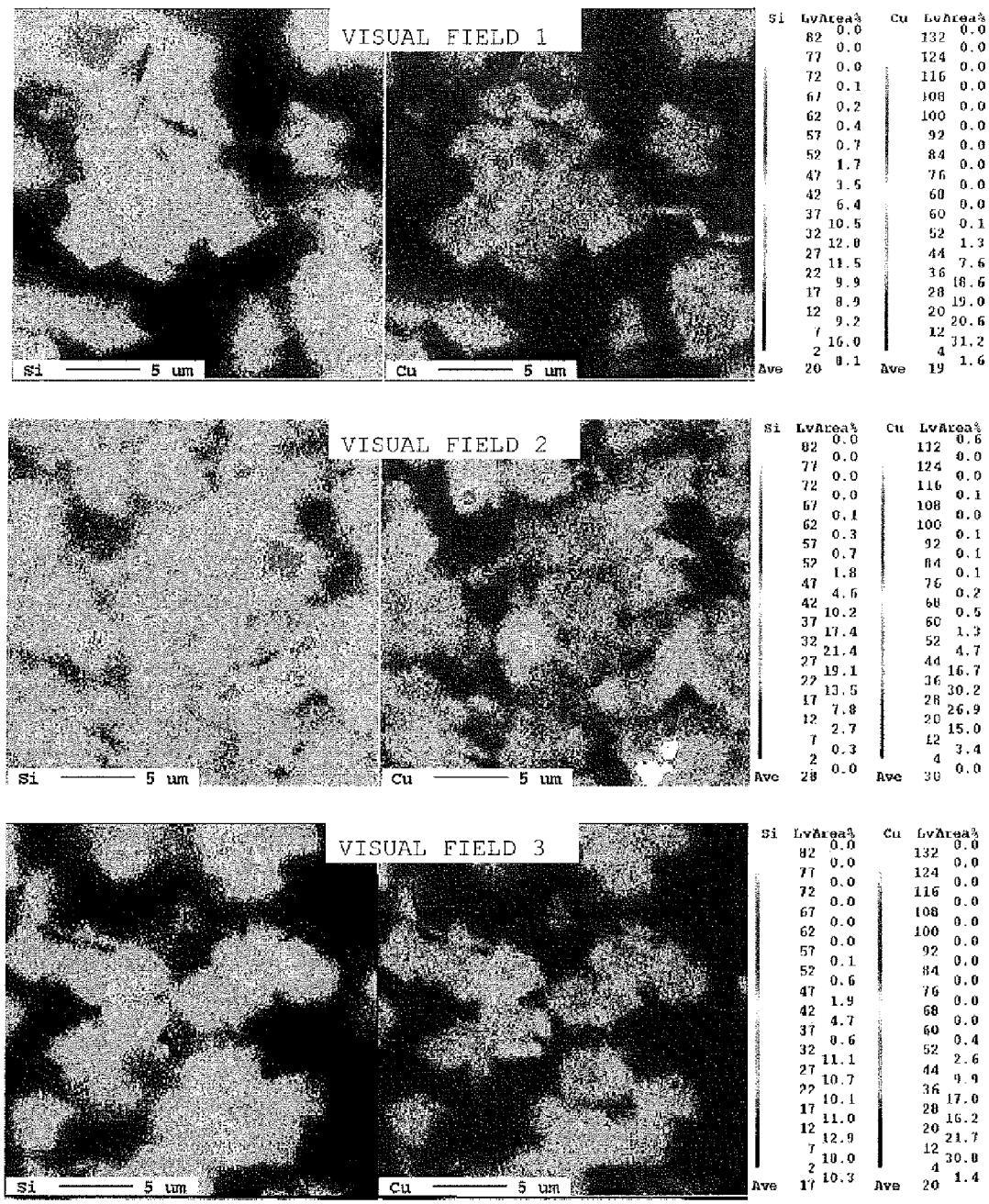
FIG. 14 is Si and Cu element maps of the zeolite 11 produced in Example 11 measured with EPMA.

FIG. 14 shows EPMA measurements (Si and Cu element maps) of the zeolite 11. The zeolite 11 had an average coefficient of variation of Cu intensity of 28.4%.

The catalytic activity and the BET specific surface area of the zeolite 11 were measured. Table 4 shows the results.

Example 12

A zeolite 12 was produced by hydrothermal synthesis performed in the same manner as in Example 11 and calcinating at 800° C. in the airflow to remove organic substances.

XRD measurement showed that the zeolite 12 had a CHA structure (framework density=14.6 T/1,000 cubic angstroms). The Cu content (W) was 5.5% by weight as determined by an XRF analysis. An XRF composition analysis of the zeolite showed that the ratios (molar ratios) of a silicon atom, an aluminum atom, and a phosphorus atom of the framework structure to the total of the silicon atom, the aluminum atom, and the phosphorus atom were 0.16 for the silicon atom, 0.50 for the aluminum atom, and 0.34 for the phosphorus atom.

Measurement of a water vapor adsorption isotherm of the zeolite 12 at 25° C. showed that the amount of adsorption at a relative vapor pressure of 0.01 was 2.09 mol/mol-Si, and the amount of adsorption at a relative vapor pressure of 0.7 was 275 mg/g.

The catalytic activity of the zeolite 12 was evaluated. Table 3 shows the results.

Comparative Example 1

A zeolite X was synthesized by a method disclosed in Example 2 of Japanese Unexamined Patent Application Publication No. 2003-183020. The resulting dried zeolite X was pulverized to 3 to 5 μm in a jet mill and was calcinated at 700° C. in the airflow to remove templates (zeolite A).

XRD measurement showed that the zeolite A had a CHA structure (framework density=14.6 T/1,000 cubic angstroms). An XRF composition analysis of the zeolite showed that the ratios (molar ratios) of a silicon atom, an aluminum atom, and a phosphorus atom of the framework structure to the total of the silicon atom, the aluminum atom, and the phosphorus atom were 0.092 for the silicon atom, 0.50 for the aluminum atom, and 0.40 for the phosphorus atom.

Measurement of a water vapor adsorption isotherm of the zeolite A at 25° C. showed that the amount of adsorption at a relative vapor pressure of 0.01 was 0.42 mol/mol-Si, and the amount of adsorption at a relative vapor pressure of 0.7 was 314 mg/g.

Comparative Example 2

1484 kg of water, 592 kg of 75% phosphoric acid, and 440 kg of pseudo-boehmite (containing 25% by weight water, manufactured by Sasol) were mixed and were stirred for three hours. 117 kg of fumed silica (Aerosil 200, manufactured by Nippon Aerosil Co., Ltd.) and 1607 kg of water were added to the liquid mixture and were stirred for 10 minutes. 285 kg of morpholine and 331 kg of triethylamine were added to the liquid mixture and were stirred for 1.5 hours to yield an aqueous gel having the following composition.

<Aqueous Gel Composition (Molar Ratio)>

$SiO_2$: 0.6

$Al_2O_3$: 1

$P_2O_5$: 0.7

Morpholine: 1

Triethylamine: 1

Water: 60

The aqueous gel was charged into a 5 m³ stainless steel autoclave, was heated to a maximum temperature of 190° C. over 10 hours while stirring, and was held at 190° C. for 24 hours. After the reaction, the product was cooled, was filtered, was washed with water, and was dried at 90° C. under vacuum. The resulting dry powder was pulverized to 3 to 5 μm in a jet mill and was calcinated at 750° C. in the airflow to remove templates, thereby yielding a zeolite B.

XRD measurement showed that the zeolite B had a CHA structure (framework density=14.6 T/1,000 cubic angstroms). An XRF elementary analysis showed that the ratios (molar ratios) of a silicon atom, an aluminum atom, and a phosphorus atom of the framework structure to the total of the silicon atom, the aluminum atom, and the phosphorus atom were 0.17 for the silicon atom, 0.52 for the aluminum atom, and 0.31 for the phosphorus atom.

Measurement of a water vapor adsorption isotherm of the zeolite B at 25° C. showed that the amount of adsorption at a relative vapor pressure of 0.01 was 0.69 mol/mol-Si, and the amount of adsorption at a relative vapor pressure of 0.7 was 262 mg/g.

Comparative Example 3

The zeolite A produced in Comparative Example 1 was loaded with 3% by weight copper by a method disclosed in Example 2A of International Publication WO 2010/084930 and was calcinated at 800° C. for two hours to yield a zeolite C.

Figure 6:
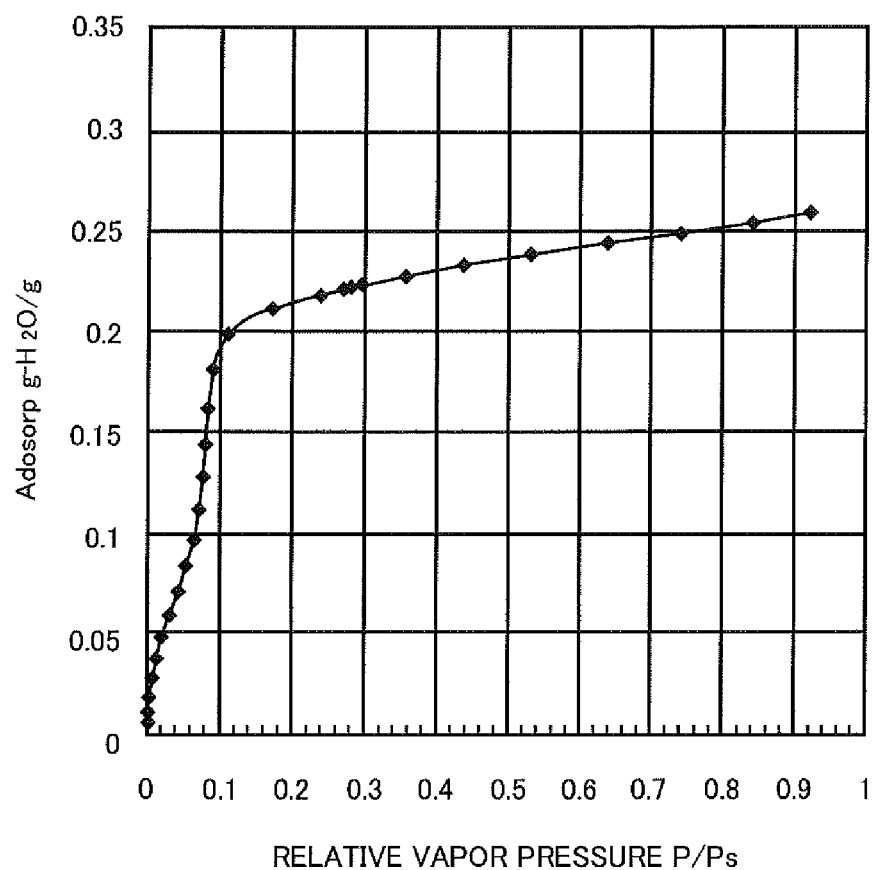
FIG. 6 is a graph of water vapor adsorption isotherm of the zeolite C produced in Comparative Example 3.

Measurement of a water vapor adsorption isotherm of the zeolite C at 25° C. showed that the amount of adsorption at a relative vapor pressure of 0.01 was 1.22 mol/mol-Si, and the amount of adsorption at a relative vapor pressure of 0.7 was 246 mg/g. FIG. 6 shows a water vapor adsorption isotherm of the zeolite C.

The catalytic activity of the zeolite C was evaluated. Table 3 shows the results.

Comparative Example 4

The zeolite A produced in Comparative Example 1 was loaded with 4% by weight copper by a method disclosed in Example 2A of International Publication WO 2010/084930 and was calcinated at 800° C. for two hours to yield a zeolite D.

Measurement of a water vapor adsorption isotherm of the zeolite D at 25° C. showed that the amount of adsorption at a relative vapor pressure of 0.01 was 29 mg/g (1.22 mol/mol-Si), and the amount of adsorption at a relative vapor pressure of 0.7 was 217 mg/g.

The catalytic activity of the zeolite D was evaluated. Table 3 shows the results.

Comparative Example 5

The zeolite B produced in Comparative Example 2 was loaded with 3.8% by weight copper by a method disclosed in Example 2A of International Publication WO 2010/084930 and was calcinated at 800° C. for two hours to yield a zeolite E.

Figure 7:
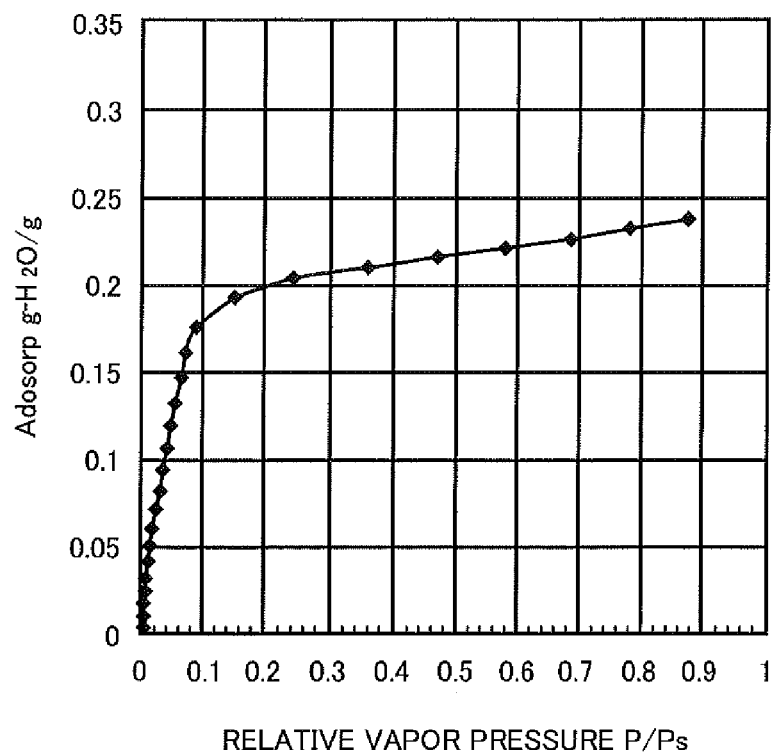
FIG. 7 is a graph of water vapor adsorption isotherm of the zeolite E produced in Comparative Example 5.

Measurement of a water vapor adsorption isotherm of the zeolite E at 25° C. showed that the amount of adsorption at a relative vapor pressure of 0.01 was 0.94 mol/mol-Si, and the amount of adsorption at a relative vapor pressure of 0.7 was 225 mg/g. FIG. 7 shows a water vapor adsorption isotherm of the zeolite E.

The catalytic activity of the zeolite E was evaluated. Table 3 shows the results.

Comparative Example 6

A zeolite F was synthesized by a method disclosed in Example 1 of Chinese Patent Application Publication No. 102259892 A.

An XRF elementary analysis showed that the Cu content (W) of the zeolite F was 5.8% by weight. The ratios (molar ratios) of a silicon atom, an aluminum atom, and a phosphorus atom to the total of the silicon atom, the aluminum atom, and the phosphorus atom were 0.17 for the silicon atom, 0.46 for the aluminum atom, and 0.37 for the phosphorus atom.

Figure 8:
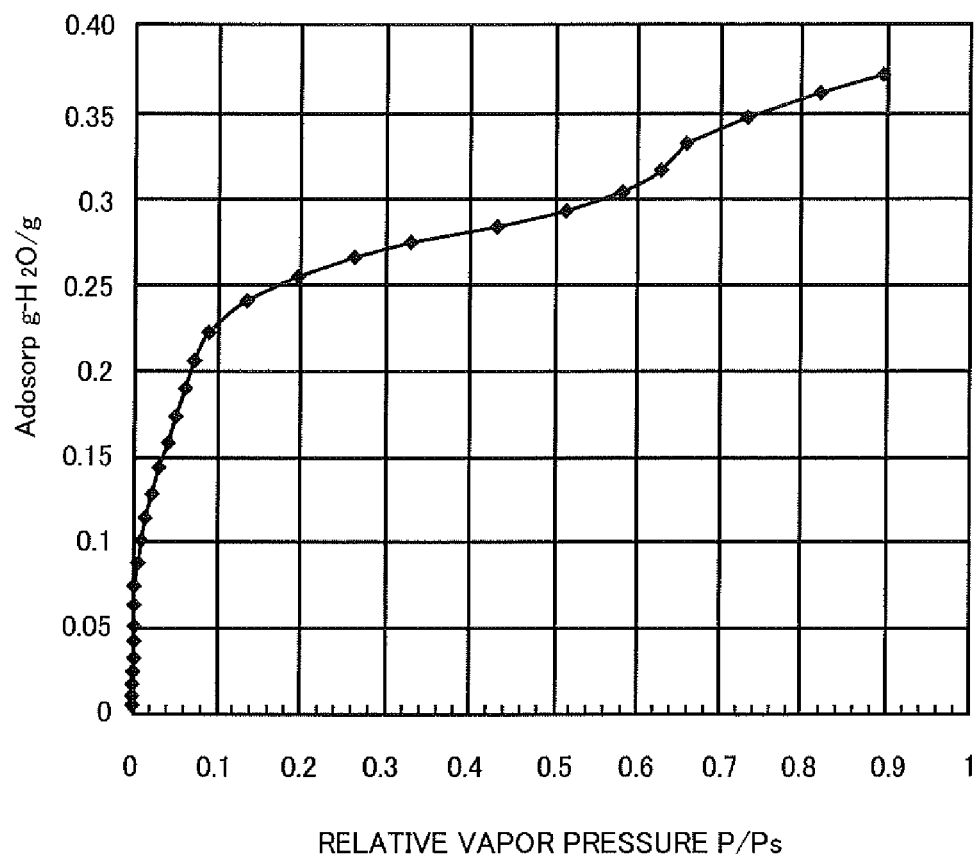
FIG. 8 is a graph of water vapor adsorption isotherm of the zeolite F produced in Comparative Example 6.

Measurement of a water vapor adsorption isotherm of the zeolite F at 25° C. showed that the amount of adsorption at a relative vapor pressure of 0.01 was 3.16 mol/mol-Si, and the amount of adsorption at a relative vapor pressure of 0.7 was 341 mg/g. FIG. 8 shows a water vapor adsorption isotherm of the zeolite F.

The catalytic activity of the zeolite F was evaluated. Table 3 shows the results.

Comparative Example 7

A zeolite G was synthesized by a method disclosed in Example 4 of U.S. Patent Application Publication No. 2010/0310440 A1.

Figure 9:
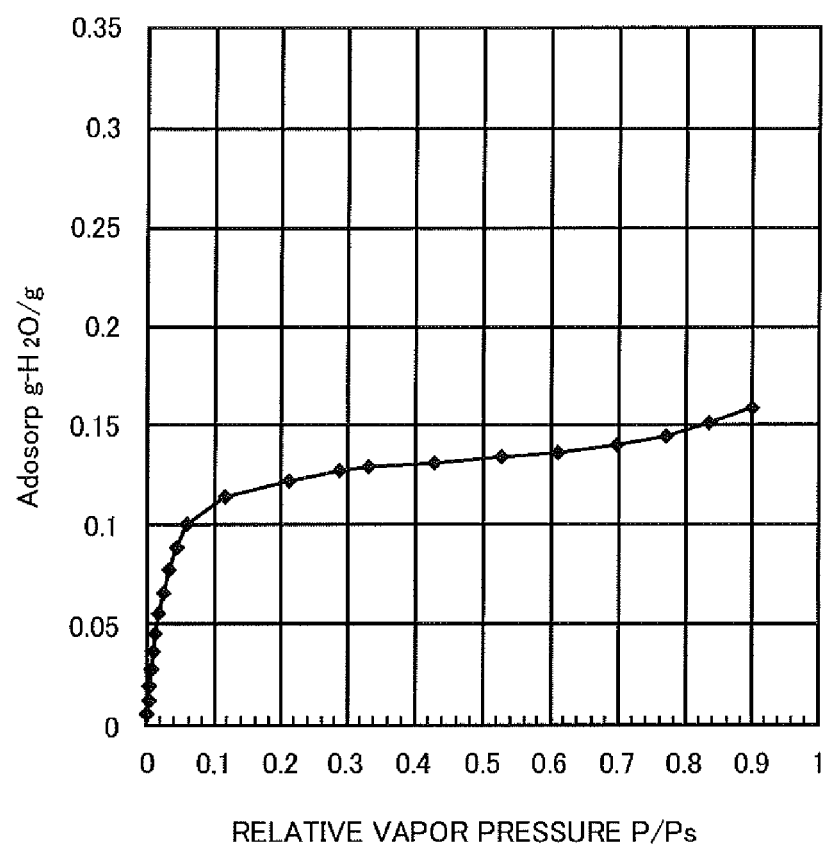
FIG. 9 is a graph of water vapor adsorption isotherm of the zeolite G produced in Comparative Example 7.

Measurement of a water vapor adsorption isotherm of the zeolite G at 25° C. showed that the amount of adsorption at a relative vapor pressure of 0.01 was 0.98 mol/mol-Si, and the amount of adsorption at a relative vapor pressure of 0.7 was 139 mg/g. FIG. 9 shows a water vapor adsorption isotherm of the zeolite G.

The catalytic activity of the zeolite G was evaluated before the hydrothermal durability test (initial activity). Table 3 shows the results.

Comparative Example 8

A zeolite H was synthesized by a method disclosed in Example 6 of U.S. Patent Application Publication No. 2010/0310440 A1.

TABLE 3

| | Water adsorption | | | NO removal efficiency | | | | | |
|---|---|---|---|---|---|---|---|---|---|
| | P/Ps = 0.01 (mol/mol-Si) | P/Ps = 0.7 (mg/g) | Reaction temperature | 150° C. | 175° C. | 200° C. | 300° C. | 400° C. | 500° C. |
| Example 4 | 1.93 | 283 | Initial activity | 47 | 84 | 95 | 99 | 91 | 78 |
| | | | After hydrothermal durability test | 56 | 88 | 96 | 99 | 89 | 79 |
| Example 9 | 3.52 | 267 | Initial activity | 67 | 96 | 99 | 100 | 90 | 81 |
| | | | After hydrothermal durability test | 60 | 92 | 98 | 100 | 93 | 79 |
| Example 10 | 3.52 | 267 | | | | | | | |
| Example 11 | 1.68 | 275 | Initial activity | 63 | 96 | 99 | 100 | 99 | 81 |
| | | | After hydrothermal durability test | 61 | 92 | 99 | 100 | 96 | 66 |
| | | | 90-60-5 durability | 55 | 92 | 98 | 100 | 97 | 76 |
| Example 12 | 2.09 | 275 | Initial activity | 61 | 94 | 99 | 100 | 95 | 72 |
| Comparative example 1 | 0.42 | 314 | | | | | | | |
| Comparative example 2 | 0.69 | 262 | | | | | | | |
| Comparative example 3 | 1.22 | 246 | Initial activity | 65 | 92 | 98 | 100 | 97 | 79 |
| | | | After hydrothermal durability test | 58 | 90 | 98 | 100 | 96 | 82 |
| | | | 90-60-5 durability | 40 | 84 | 89 | 98 | 96 | 76 |
| Comparative example 4 | 1.22 | 217 | Initial activity | 56 | 88 | 98 | 100 | 91 | 66 |
| Comparative example 5 | 0.94 | 225 | Initial activity | 56 | 92 | 98 | 100 | 94 | 74 |
| | | | After hydrothermal durability test | 56 | 90 | 97 | 99 | 92 | 79 |
| | | | 90-60-5 durability | 51 | 84 | 95 | 100 | 93 | 76 |
| Comparative example 6 | 3.16 | 341 | Initial activity | 60 | 88 | 95 | 99 | 98 | 79 |
| | | | After hydrothermal durability test | 6 | 21 | 41 | 79 | 80 | 64 |
| Comparative example 7 | 0.98 | 139 | Initial activity | 19 | 47 | 70 | 94 | 94 | 80 |

These results show that when the amount of adsorption of a transition-metal-containing silicoaluminophosphate zeolite is less than 1.3 mol/mol-Si at a relative vapor pressure of 0.01 in a water vapor adsorption isotherm measured at 25° C., the transition-metal-containing silicoaluminophosphate zeolite has low catalytic activity or low-temperature catalytic activity after the water vapor adsorption and desorption cycle durability test. When the amount of adsorption of a transition-metal-containing silicoaluminophosphate zeolite is less than 150 mg/g at a relative vapor pressure of 0.7, the transition-metal-containing silicoaluminophosphate zeolite has low catalytic activity. When the amount of adsorption of a transition-metal-containing silicoaluminophosphate zeolite is more than 300 mg/g at a relative vapor pressure of 0.7, the transition-metal-containing silicoaluminophosphate zeolite has low hydrothermal durability.

In contrast, the transition-metal-containing zeolite containing a silicon atom, a phosphorus atom, and an aluminum atom in at least its framework structure according to the second invention, which has a water vapor adsorption isotherm measured at 25° C. showing that the amount of adsorption at a relative vapor pressure of 0.01 is 1.3 mol/mol-Si or more and the amount of adsorption at a relative vapor pressure of 0.7 is 150 mg/g or more and 300 mg/g or less, has high catalytic activity and hydrothermal durability, high catalytic activity after the water vapor adsorption and desorption cycle durability test, and high stability during water adsorption and desorption.

[Evaluation of Zeolites C, F, and H]

<Zeolite C>

An ICP composition analysis of the zeolite C produced in Comparative Example 3 showed that the ratios (molar ratios) of a silicon atom, an aluminum atom, and a phosphorus atom of the framework structure to the total of the silicon atom, the aluminum atom, and the phosphorus atom were 0.09 for the silicon atom, 0.50 for the aluminum atom, and 0.41 for the phosphorus atom. The Cu content (W) of the zeolite C was 3% by weight as determined by an XRF analysis.

Figure 15:
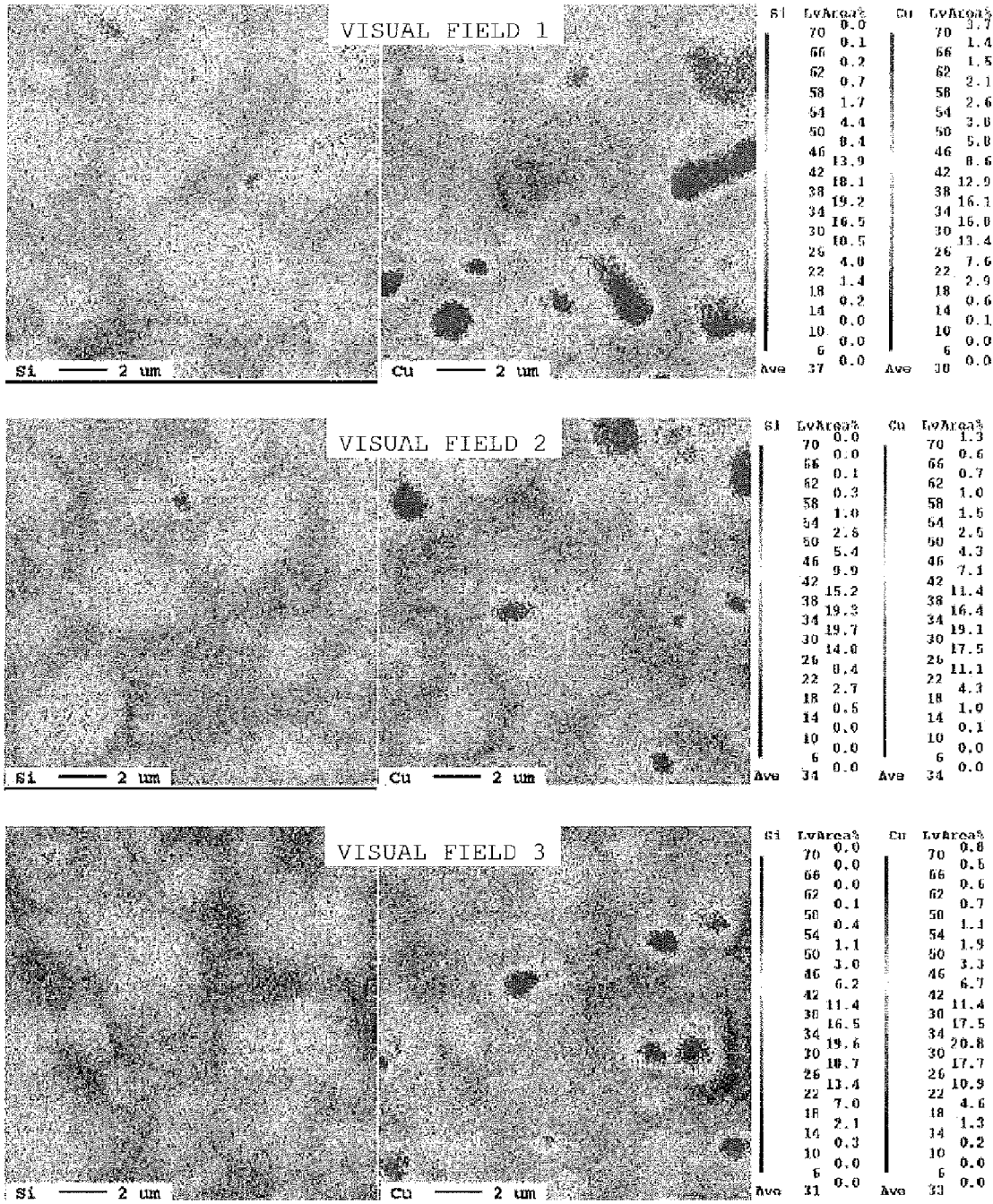
FIG. 15 is Si and Cu element maps of the zeolite C produced in Comparative Example 3 measured with EPMA.

FIG. 15 shows EPMA measurements (Si and Cu element maps) of the zeolite C. The zeolite C had an average coefficient of variation of Cu intensity of 34.1%.

The BET specific surface area of the zeolite C was measured. Table 4 shows the results together with the evaluation of catalytic activity in Comparative Example 3.

<Zeolite F>

Figure 16:
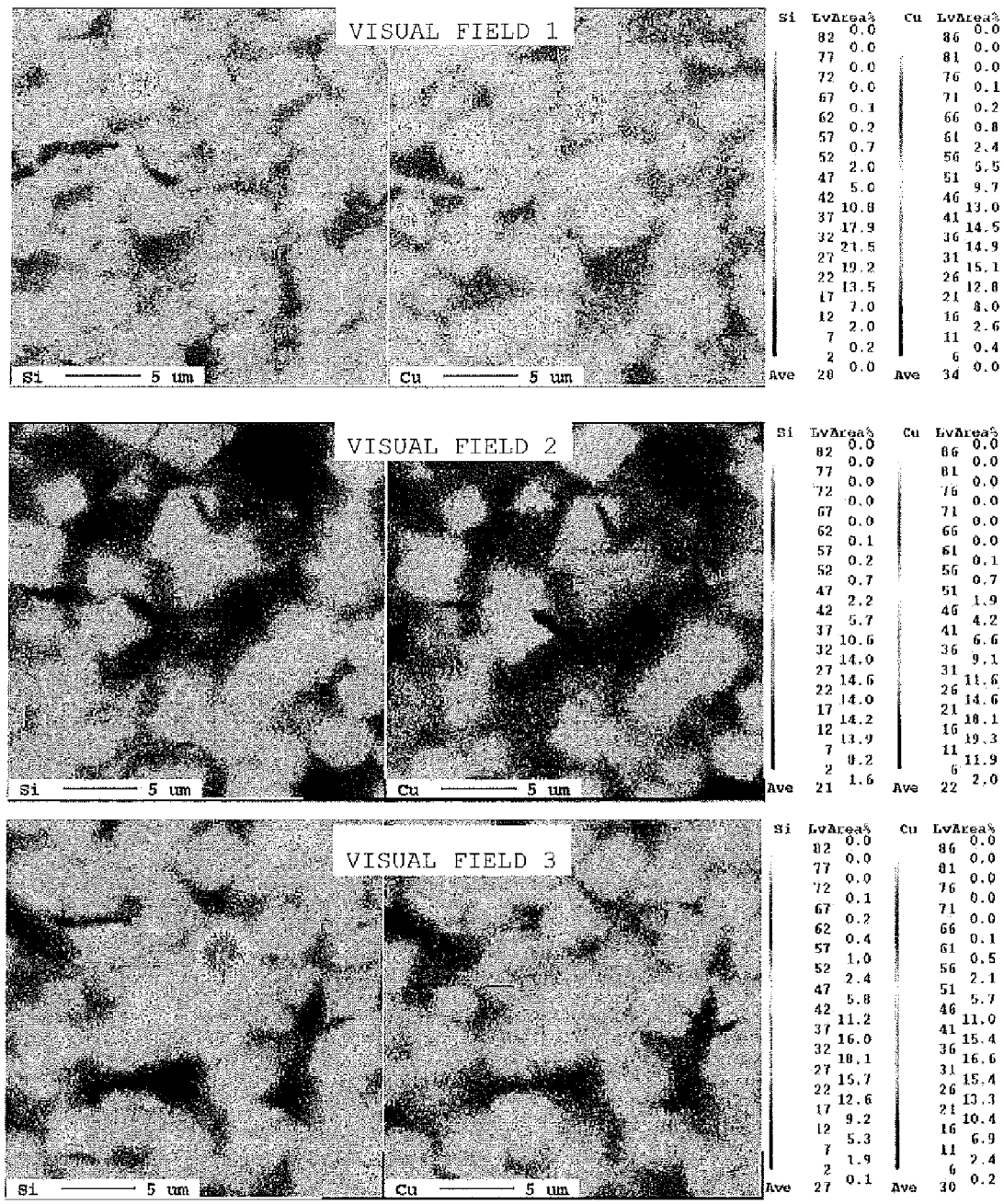
FIG. 16 is Si and Cu element maps of the zeolite F produced in Comparative Example 6 measured with EPMA.

FIG. 16 shows EPMA measurements (Si and Cu element maps) of the zeolite F having a Cu content (W) of 5.8% by weight produced in Comparative Example 6. The zeolite F had an average coefficient of variation of Cu intensity of 28.2%.

The BET specific surface area of the zeolite F was measured. Table 4 shows the results together with the evaluation of catalytic activity in Comparative Example 6.

<Zeolite H>

An XRF elementary analysis of the zeolite H produced in Comparative Example 8 showed that the ratios (molar ratios) of a silicon atom, an aluminum atom, and a phosphorus atom of the framework structure to the total of the silicon atom, the aluminum atom, and the phosphorus atom were 0.12 for the silicon atom, 0.51 for the aluminum atom, and 0.37 for the phosphorus atom.

The Cu content (W) was 3.4% by weight as determined by an XRF analysis.

Figure 17:
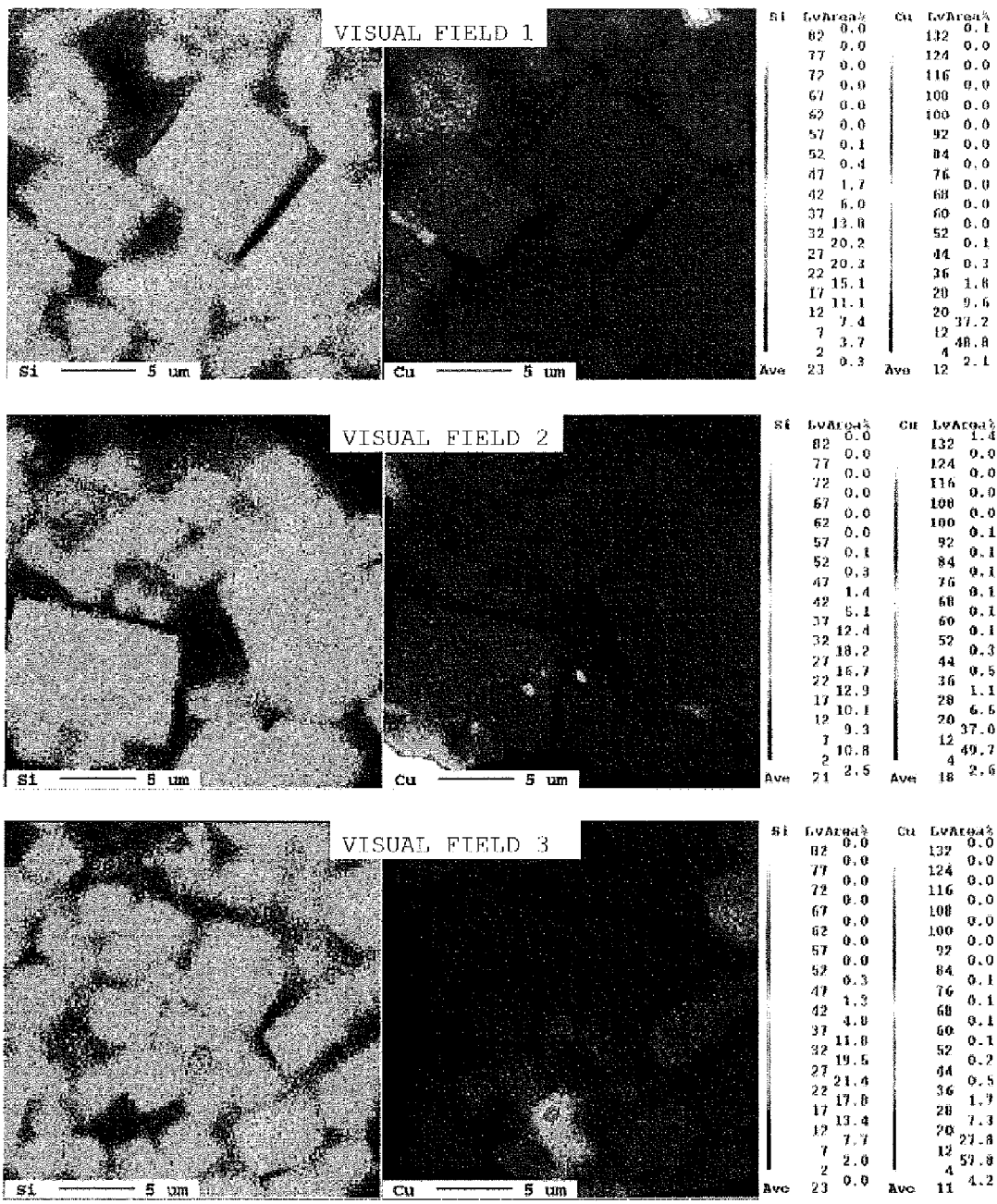
FIG. 17 is Si and Cu element maps of the zeolite H produced in Comparative Example 8 measured with EPMA.

FIG. 17 shows EPMA measurements (Si and Cu element maps) of the zeolite H. The zeolite H had an average coefficient of variation of Cu intensity of 43.1%.

The BET specific surface area of the zeolite H was measured. Table 4 shows the results together with the evaluation of catalytic activity in Comparative Example 8.

Comparative Example 9

A zeolite I was synthesized by a method disclosed in Comparative Example 5 of WO 2010/084930 A1.

The Cu content (W) of the zeolite I was 2.8% by weight as determined by an XRF analysis.

Figure 18:
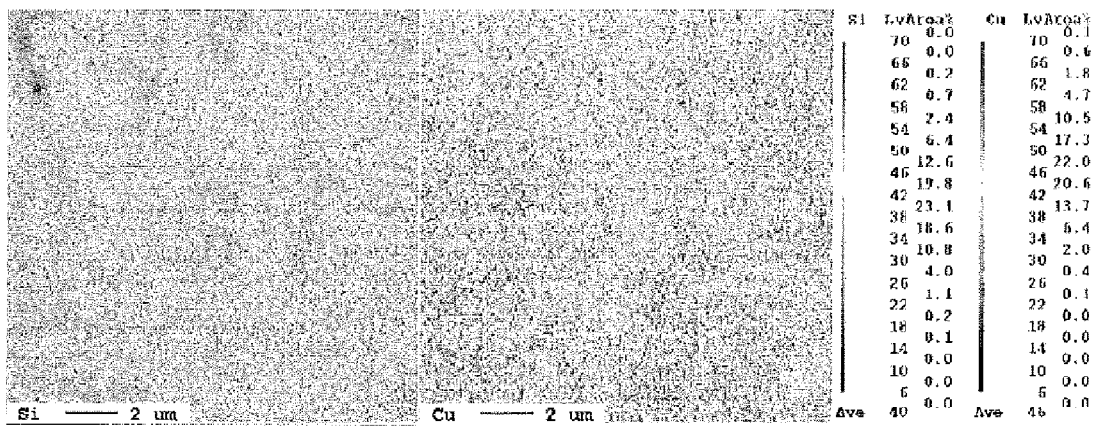
FIG. 18 is a Si and Cu element map of the zeolite I produced in Comparative Example 9 measured with EPMA.

FIG. 18 shows EPMA measurements (Si and Cu element maps). The zeolite H had a coefficient of variation of Cu intensity of 15%.

The catalytic activity of the zeolite I was evaluated. Table 4 shows the results.

and efficiently producing a transition-metal-containing silicoaluminophosphate zeolite having excellent high-temperature hydrothermal durability.

A transition-metal-containing zeolite produced by the method for producing a transition-metal-containing zeolite according to the first invention can be used to efficiently remove nitrogen oxides contained in exhaust gases emitted from diesel engines and reduce the amount of catalyst because the transition-metal-containing zeolite does not deteriorate even in high-temperature exhaust gases.

A transition-metal-containing zeolite produced by a method for producing the transition-metal-containing zeolite according to the second invention can be used as a zeolite water vapor adsorbent to provide an adsorption heat pump

TABLE 4

| | Cu content W (wt %) | BET specific surface area ($m^2/g$) | Average coefficient of variation (%) | Al/(Si + P) [mol/mol] | Reaction temperature | Catylite activity (NO removal efficiency (%)) | | | | | |
|---|---|---|---|---|---|---|---|---|---|---|---|
| | | | | | | 150° C. | 175° C. | 200° C. | 300° C. | 400° C. | 500° C. |
| Example 9 (Zeolite 9) | 4.3 | 647 | 27.9 | 0.97 | Initial activity | 67 | 96 | 99 | 100 | 90 | 81 |
| | | | | | After hydrothermal durability test | 60 | 92 | 98 | 100 | 93 | 79 |
| Example 11 (Zeolite 11) | 5.1 | 590 | 28.4 | 1 | Initial activity | 63 | 96 | 99 | 100 | 99 | 81 |
| | | | | | After hydrothermal durability test | 61 | 92 | 99 | 100 | 96 | 66 |
| | | | | | 90-60-5 durability | 55 | 92 | 98 | 100 | 97 | 76 |
| Comparative example 3 (Zeolite C) | 3 | 414 | 34.1 | 1.02 | Initial activity | 65 | 92 | 98 | 100 | 97 | 79 |
| | | | | | 90-60-5 durability | 40 | 84 | 89 | 98 | 96 | 76 |
| Comparative example 6 (Zeolite F) | 5.8 | 610 | 28.2 | 0.85 | Initial activity | 60 | 88 | 95 | 99 | 98 | 79 |
| | | | | | After hydrothermal durability test | 6 | 21 | 41 | 79 | 80 | 64 |
| Comparative example 7 (Zeolite G) | 3.4 | 570 | 43.1 | 1.04 | Initial activity | 34 | 72 | 88 | 97 | 97 | 97 |
| Comparative example 8 (Zeolite H) | 2.8 | | 15 | | Initial activity | 33 | 71 | 92 | | | |

Table 4 shows that the zeolite I according to Comparative Example 9 has a low coefficient of variation for Cu but has a low Cu content and poor catalytic performance. An increase in the Cu content of the zeolites C and H according to Comparative Examples 3 and 8 resulted in an increased coefficient of variation, reduced catalytic activity, and reduced catalytic activity after the water vapor adsorption and desorption cycle durability test. Although the zeolite F according to Comparative Example 6 had a high Cu content and a low coefficient of variation for Cu, its catalytic activity after the hydrothermal durability test was very low because the molar ratio of the aluminum atom to the total of the silicon atom and the phosphorus atom was 0.9 or less.

In contrast to the poor catalytic performance of the zeolites C, F, H, and I according to Comparative Examples 3, 6, 8, and 9, the third invention can provide a transition-metal-containing aluminophosphate zeolite that has a high transition metal content and a low coefficient of variation (excellent transition metal dispersion) as well as excellent zeolite structure stability because the molar ratio of the aluminum atom to the total of the silicon atom and the phosphorus atom is 0.9 or more. This transition-metal-containing zeolite has high catalytic activity and stability.

INDUSTRIAL APPLICABILITY

The method for producing a transition-metal-containing zeolite according to the first invention is a method for easily that can operate with a relatively low temperature heat source having a temperature of 100° C. or less.

The transition-metal-containing zeolite according to the third invention has a high transition metal content, excellent transition metal dispersion, and high stability.

The transition-metal-containing zeolite according to the third invention can be used to efficiently remove nitrogen oxides contained in exhaust gases emitted from diesel engines.

REFERENCE SIGNS LIST 1, 2, 3 thermostatic chamber
4, 6 container
5 vacuum vessel

[Rectification Under Rule 91 Jun. 20, 2012]

Although the present invention has been described in detail with reference to particular embodiments, it is apparent to a person skilled in the art that various modifications can be made therein without departing from the spirit and scope of the present invention.

The present application is based on Japanese Patent Application (Japanese Patent Application No. 2011-141990) filed on Jun. 27, 2011 and Japanese Patent Application (Japanese Patent Application No. 2012-092905) filed on Apr. 16, 2012, which are incorporated herein by reference in their entirety.

The invention claimed is:

1. An aluminophosphate zeolite containing 3% by weight or more transition metal M, wherein element mapping of the transition metal M in the zeolite determined with an electron probe microanalyzer shows that the coefficient of variation in intensity of the transition metal M is 33% or less and that the molar ratio of an aluminum atom to the total of a silicon atom and a phosphorus atom is 0.9 or more, and wherein the transition metal M is copper.

2. The transition-metal-containing zeolite according to claim 1, wherein the zeolite has an 8-membered ring structure in its framework structure.

3. The transition-metal-containing zeolite according to claim 1, wherein the zeolite has a BET specific surface area of 500 m$^2$/g or more.

4. The transition-metal-containing zeolite according to claim 1, wherein the zeolite has a framework density of 10.0 T/1000 cubic angstroms or more and 16.0 T/1000 cubic angstroms or less in accordance with a zeolite structure defined by the International Zeolite Association (IZA).

5. The transition-metal-containing zeolite according to claim 1, wherein the zeolite has a zeolite structure of CHA as defined by the International Zeolite Association (IZA).

6. An exhaust gas treatment catalyst, comprising the transition-metal-containing zeolite according to claim 1.

7. A water vapor adsorbent, comprising the transition-metal-containing zeolite according to claim 1.

8. The transition-metal-containing zeolite according to claim 1, produced by the method for producing a transition-metal-containing zeolite that contains at least a silicon atom, a phosphorus atom, and an aluminum atom in its framework structure, comprising: hydrothermal synthesis using an aqueous gel containing a silicon atom raw material, an aluminum atom raw material, a phosphorus atom raw material, a transition metal raw material, and a polyamine (other than diamines).

9. The transition-metal-containing zeolite according to claim 8, wherein the aqueous gel further contains at least one selected from the group consisting of alicyclic heterocyclic compounds containing at least a nitrogen atom as a heteroatom, alkylamines, cycloalkylamines, and tetraalkylammonium hydroxides.

10. The transition-metal-containing zeolite according to claim 8, wherein the polyamine has a general formula of $H_2N$—$(C_nH_{2n}NH)_x$—$H$ (wherein n denotes an integer in the range of 2 to 6, and x denotes an integer in the range of 2 to 10).

11. The transition-metal-containing zeolite according to claim 8, wherein
the molar ratios of the aluminum atom raw material, the silicon atom raw material, the phosphorus atom raw material, and the transition metal (M) raw material of the aqueous gel on an oxide basis are as follows:
the $SiO_2/Al_2O_3$ ratio is 0.1 or more and 0.8 or less,
the $P_2O_5/Al_2O_3$ ratio is 0.6 or more and 1.2 or less, and
the $M_aO_b/Al_2O_3$ ratio is 0.05 or more and 1 or less (wherein a and b denote the atomic ratios of M and O, respectively).

12. The aluminophosphate zeolite according to claim 1, wherein the coefficient of variation in intensity of the transition metal M is 31% or less.

13. The aluminophosphate zeolite according to claim 1, wherein the coefficient of variation in intensity of the transition metal M is 29% or less.

14. The aluminophosphate zeolite according to claim 1, wherein the molar ratio of an aluminum atom to the total of a silicon atom and a phosphorus atom is 0.93 or more.

* * * * *